US009934294B2

(12) United States Patent
Srivastava et al.

(10) Patent No.: US 9,934,294 B2
(45) Date of Patent: Apr. 3, 2018

(54) SYSTEM AND METHOD FOR USING PAST OR EXTERNAL INFORMATION FOR FUTURE SEARCH RESULTS

(71) Applicant: Wal-Mart Stores, Inc., Bentonville, AR (US)

(72) Inventors: Varun Srivastava, Sunnyvale, CA (US); Yiye Ruan, Columbus, OH (US); Yan Zheng, San Jose, CA (US)

(73) Assignee: WAL-MART STORES, INC., Bentonville, AR (US)

(*) Notice: Subject to any disclaimer, the term of this patent is extended or adjusted under 35 U.S.C. 154(b) by 505 days.

(21) Appl. No.: 14/498,538

(22) Filed: Sep. 26, 2014

(65) Prior Publication Data

US 2016/0092520 A1    Mar. 31, 2016

(51) Int. Cl.
  *G06F 17/30*   (2006.01)
  *G06Q 30/06*   (2012.01)
(52) U.S. Cl.
  CPC .. *G06F 17/30554* (2013.01); *G06F 17/30477* (2013.01); *G06F 17/30575* (2013.01); *G06Q 30/06* (2013.01)
(58) Field of Classification Search
  CPC .............. G06F 17/30598; G06F 17/30575
  USPC ......................................... 707/737
  See application file for complete search history.

(56) References Cited

U.S. PATENT DOCUMENTS

| 5,659,743 | A  | 8/1997  | Adams |
| 7,594,189 | B1 | 9/2009  | Walker et al. |
| 7,676,521 | B2 | 3/2010  | Wang et al. |
| 7,882,045 | B1 | 2/2011  | Cole et al. |
| 8,326,825 | B2 | 12/2012 | Nehme et al. |
| 8,429,120 | B1 | 4/2013  | Patel |
| 8,555,018 | B1 | 10/2013 | Rohr |
| 8,688,603 | B1 | 4/2014  | Kurup et al. |
| 8,738,624 | B1 | 5/2014  | Wang et al. |
| 8,868,535 | B1 | 10/2014 | Paiz |
| 2003/0018639 | A1 | 1/2003  | Iyengar |
| 2004/0220963 | A1 | 11/2004 | Chen |
| 2004/0230764 | A1 | 11/2004 | Merchant |
| 2005/0081009 | A1 | 4/2005  | Williams |
| 2007/0239734 | A1 | 10/2007 | Arellanes |
| 2007/0255736 | A1 | 11/2007 | Chakrabarti |
| 2008/0133456 | A1 | 6/2008  | Richards |
| 2009/0158016 | A1 | 6/2009  | Clarke |

(Continued)

OTHER PUBLICATIONS

Domingos, Pedro. "Metacost: A general method for making classifiers cost-sensitive." Proceedings of the fifth ACM SIGKDD international conference on Knowledge discovery and data mining. ACM, 1999.

*Primary Examiner* — Marc Filipczyk
(74) *Attorney, Agent, or Firm* — Bryan Cave LLP

(57) ABSTRACT

A system and method for using past information for future search results is disclosed. A database system may comprise a first database cluster H and a second database cluster L. Social media mentions are mapped to products in the database system. Thereafter, each record in the database system is tracked to determine if mentions on social media platforms are increasing or decreasing, using a social media popularity trend signal. The social media popularity trend signal is created by comparing social media mentions during one time period to social media mentions in another time period. Other embodiments are also disclosed herein.

2 Claims, 24 Drawing Sheets

(56) References Cited

U.S. PATENT DOCUMENTS

| | | | |
|---|---|---|---|
| 2009/0171813 A1* | 7/2009 | Byrne | G06F 17/30867 |
| | | | 705/26.1 |
| 2009/0276716 A1 | 11/2009 | Chua | |
| 2009/0281877 A1 | 11/2009 | Bezos | |
| 2010/0191742 A1 | 7/2010 | Stefik | |
| 2010/0274983 A1 | 10/2010 | Murphy | |
| 2010/0281230 A1 | 11/2010 | Rabii | |
| 2011/0035379 A1* | 2/2011 | Chen | G06F 17/30536 |
| | | | 707/740 |
| 2012/0022917 A1 | 1/2012 | Lawton | |
| 2012/0078825 A1 | 3/2012 | Kulkarni et al. | |
| 2012/0221571 A1 | 8/2012 | Orman | |
| 2013/0346157 A1 | 12/2013 | Avrilionis | |
| 2014/0067786 A1* | 3/2014 | Newey | G06F 17/30867 |
| | | | 707/708 |
| 2015/0039620 A1 | 2/2015 | Ning | |
| 2015/0324447 A1 | 11/2015 | Kim | |
| 2016/0092520 A1 | 3/2016 | Srivastava | |
| 2016/0092772 A1 | 3/2016 | Srivastava | |
| 2016/0239776 A1 | 8/2016 | Feng | |

* cited by examiner

SYSTEM AND METHOD FOR USING PAST OR EXTERNAL INFORMATION FOR FUTURE SEARCH RESULTS

TECHNICAL FIELD

This disclosure relates generally to database systems, and relates more particularly to database systems used in an electronic commerce environment.

BACKGROUND

The purchase of products via online retailers has become mainstream, which has allowed customers to order an increasing number of products online and receive direct shipments of the items they order. In order to find a product to purchase, a customer typically accesses a retailer through an interface accessed via the World Wide Web or via an app used on a smartphone or tablet. A customer may perform a search to find a product to purchase. Therefore, a retailer typically has a database system that contains information about products available for purchase. The database system may include information such as the name of the product, a description of the product, availability of the product, and the price of the product.

As a retailer adds to the number of items it has for purchase, the retailer may discover that the performance of the database system may begin to slow. Thus, a retailer wants to provide a database system that provides fast access to product information.

BRIEF DESCRIPTION OF THE DRAWINGS

To facilitate further description of the embodiments, the following drawings are provided in which.

Figure 1:
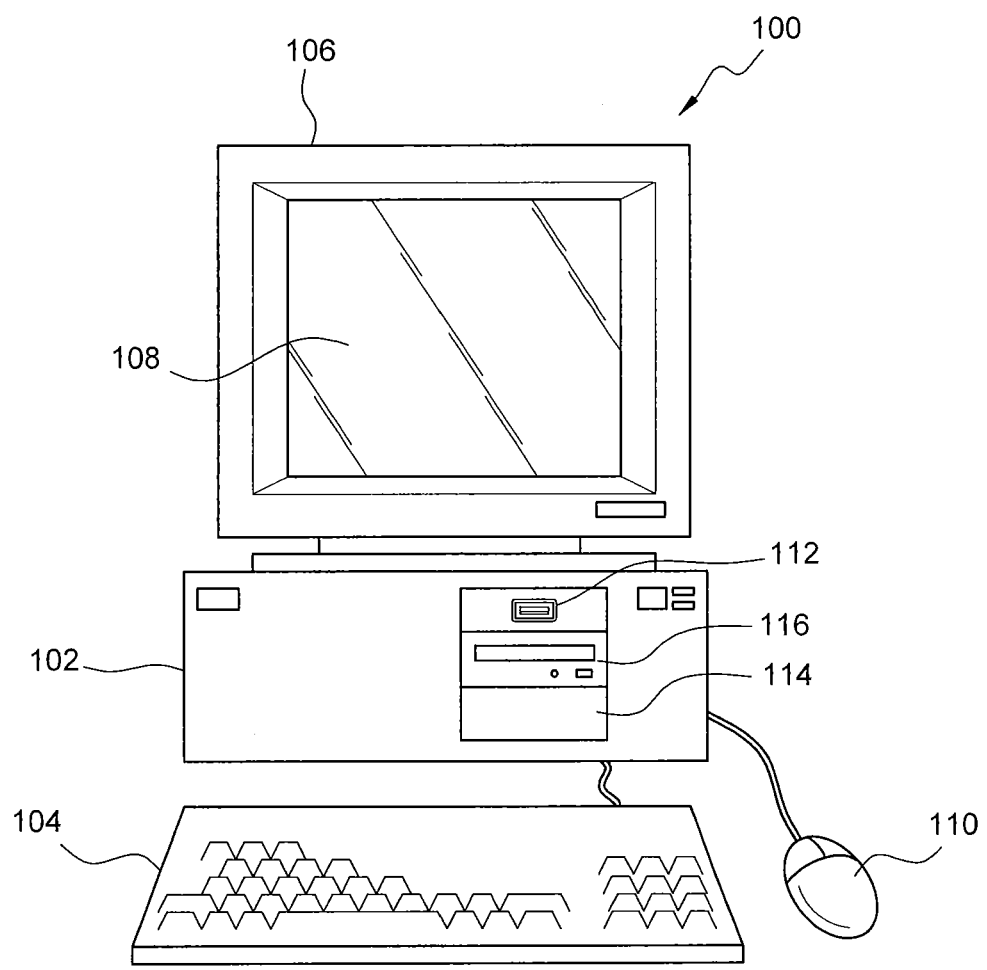
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method of searching a database system, the database system comprising a first database cluster H with a first index H and a second database cluster L with a second index L, the method being implemented via execution of computer instructions configured to run on one or more processing modules and configured to be stored at one or more non-transitory memory storage modules, the method comprising: receiving a search request from a requester; executing the search request in the first database cluster H using the first index H to retrieve a first set of results; and determining if the first set of results is greater than a minimum number of results. If the first set of results is greater than the minimum number of results, then presenting the first set of results to the requester; if the first set of results is less than the minimum number of results, executing the search request in the second database cluster L using the second index L to retrieve a second set of results; presenting the first set of results and the second set of results to the requester. The first database cluster H is stored on a first database server; and the second database cluster L is stored on a second database server apart from the first database server.

In one embodiment, a method of grouping a set of distinct records in a database system is presented. The database system can comprise a first database cluster H and a second database cluster L, the method being implemented via execution of computer instructions configured to run at one or more processing modules and configured to be stored at one or more non-transitory memory storage modules. The method can comprise determining, for each distinct record (i) of the set of distinct records, whether the record is a first priority or a second priority; for each record (i) of the set of distinct records which is determined to be the first priority, placing the record in the first database cluster H; and for each record (i) of the set of distinct records which is determined to be the second priority, placing the record in the second database cluster L; wherein the first priority is a higher priority than the second priority.

In one embodiment, a system for performing searches can comprise: one or more processing modules; and one or more non-transitory memory storage modules storing computing instructions configured to run on the one or more processing modules and perform the acts of: receiving a search request from a requester; executing the search request in the first database cluster H using the first index H to retrieve a first set of results; determining if the first set of results is greater than a minimum number of results; if the first set of results is greater than the minimum number of results, then presenting the first set of results to the requester; if the first set of results is less than the minimum number of results, executing the search request in the second database cluster L using the second index L to retrieve a second set of results; and presenting the first set of results and the second set of results to the requester. The first database cluster H can be stored on a first database server and the second database cluster L can be stored on a second database server apart from the first database server.

Various embodiments include a method of grouping a set of distinct records in a database system, the database system comprising a first database cluster H and a second database cluster L, the method being implemented via execution of computer-instructions configured to run on one or more processing modules and configured to be stored on one or more non-transitory memory storage modules. The method can comprise: training a machine learning algorithm to create a predictive model; in a set of distinct records in a database system, the database system comprising a first database cluster H and a second database cluster L, for each record of the set of distinct records, using the predictive model to calculate a probability of the record being accessed; for each record of the set of distinct records, if the calculated probability of the record being accessed is greater than a threshold value, then placing the record in the first database cluster H; for each record of the set of distinct records, if the calculated probability of the record being accessed is not greater than the threshold value, then placing the record in the second database cluster L; receiving a request from a requester for at least one record of the set of distinct records; and presenting the at least one record from the set of distinct records to the requester in response to the request. The method can be implemented via execution of computer instructions configured to run on one or more processing modules and configured to be stored on one or more non-transitory memory storage modules. Training the machine learning algorithm can comprise: for each record in the set of distinct records, inputting a training feature vector associated with the record into the machine learning algorithm, each training feature vector comprising a list of characteristics of the record; for each record in the set of distinct records, inputting a cost vector associated with the record into the machine learning algorithm, each cost vector configured to train the machine learning algorithm to reduce a probability of a false negative prediction for the record; and iteratively operating the machine learning algorithm on each record in the set of distinct records to create the predictive model.

In one embodiment, a system can comprise: one or more processing modules; and one or more non-transitory memory storage modules storing computing instructions configured to run on the one or more processing modules and perform the acts of: training a machine learning algorithm to create a predictive model; for each record of the set of distinct records, using the predictive model to calculate a probability of the record being accessed; for each record of the set of distinct records, if the calculated probability of the record being accessed is greater than a threshold value, then placing the record in a first database cluster H; for each record of the set of distinct records, if the calculated probability of the record being accessed is not greater than the threshold value, then placing the record in a second database cluster L; receiving a request from a requester for at least one record of the set of distinct records; and presenting the at least one record from the set of distinct records to the requester in response to the request. Training the machine learning algorithm can comprise: for each record in the set of distinct records, inputting a training feature vector associated with the record into the machine learning algorithm, each training feature vector comprising a list of characteristics of the record; for each record in the set of distinct records, inputting a cost vector associated with the record into the machine learning algorithm, each cost vector configured to train the machine learning algorithm to reduce a probability of a false negative prediction for the record; and iteratively operating the machine learning algorithm on each record in the set of distinct records to create the predictive model.

In one embodiment, a method can comprise: receiving a request to analyze a record of a database from a requesting party; retrieving a feature vector corresponding to the requested record; calculating a prediction of the probability that the record will be requested within a predetermined time period, the prediction being based on a predictive model used in conjunction with the feature vector; and presenting the calculated probability to the requesting party; wherein the method is implemented via execution of computer instructions configured to run on one or more processing modules and configured to be stored on one or more non-transitory memory storage modules.

E-commerce companies often build an index for products that they are selling, such that search queries from customers can be answered faster. The size of the index increases approximately linearly with an increase in the number of products. Therefore, as e-commerce companies are increasing the number of products available, the index size is also increasing, up to the point where it cannot be hosted on a single server's main memory capacity, thus negatively affecting search engine performance due to increased latency.

One strategy to address this challenge is to divide all items into multiple groups, and to build index structures for each group, so that each index structure can fit in one server's main memory. The grouping of items has to be performed carefully. Random grouping (for example, a "round-robin" approach) has the effect that most index groups will need to be accessed as they all contain relevant items to a particular search query. This approach is undesirable for the preservation of computing resources.

Therefore, the task is to devise a mechanism of creating a prioritized product index structure, such that only one index group will need to be accessed for most queries. This structure will benefit search engine scaling (because information concerning more products can be hosted) and computing resource prioritization (for example, bandwidth allocation and index replication).

In order to fully utilize the prioritized product index structure described above, one may desire to divide the products available at an e-commerce website into multiple groups and build a prioritized index structure, such that for most of the customer queries, only one group index will be accessed. Particularly, the problem can be simplified into one where all the items are divided into two groups: a "hot" group containing the items that are predicted to be accessed by most of the queries and a "cold" cluster which contains cold items that have a low likelihood of being accessed by queries.

One challenge here is that the mechanism should produce a very small number of Type-II errors (e.g., false negatives). A false negative is when a product is assigned to the cold cluster, but is required to be accessed by some queries. In such a case, a high penalty is incurred due to potentially longer latency, higher access cost, and longer access time for the cold cluster, and a decrease in conversion rate due to those factors. On the other hand, Type-I errors (false positives, when an item is predicted to be hot, but is not actually hot) do not produce as large of an impact because redundancy in the hot cluster is acceptable to a certain degree, as long as the size of the hot cluster does not go beyond a certain size.

Since indices are built for upcoming queries, these predictions are for the status of an item in the future, only using information that is currently available. It is desirable to have these predictions be as accurate as possible.

The problem to be solved is to create a prediction algorithm that classifies each product as either hot or cold such that the false negative rate is very low. In one embodiment, the goal is a false negative rate of less than one percent.

One solution is to build a supervised machine learning model that uses knowledge of products' historical access data. The machine learning model accepts inputs in the form of a feature vector, which includes a series of characteristic signals and whether the particular product was accessed previously (i.e., the "label"). The output of the machine learning model is a probability distribution over two possible outcomes: 1) the product being accessed in the future, and 2) the product not being accessed in the future. If the probability of the first outcome is greater than a certain amount, the product is predicted to be accessed in the future. Otherwise, it is not predicted to be accessed in the future.

To address the desirability of a low Type-II error rate, a cost-sensitive supervised learning algorithm can be deployed. Briefly speaking, given costs associated with each type of prediction error, feature vectors of products are modified such that the overall cost is minimized. This process is repeated for multiple iterations in order to further reduce the error cost.

Various embodiments include a method comprising: determining: (a) a total number of records in a set of distinct records contained in a database system; and (b) a total number of records in the set of distinct records in a second database cluster L, wherein the database system comprises a first database cluster H and the second database cluster L, and wherein the total number of records contained in the database system comprises the total number of records in the second database cluster L plus the total number of records in the first database cluster H; if the total number of records in the second database cluster L is greater than a target number of records in the second database cluster L, then iterating through each record in the set of distinct records, and, for each record in the second database cluster L: generating a random number; and using the random number to determine if the record should be moved from the second database cluster L to the first database cluster H; receiving a search request from a requester; and presenting a search result containing one or more records of the set of distinct records to the requester.

In some embodiments, a system can comprise: one or more processing modules; and one or more non-transitory memory storage modules storing computing instructions configured to run on the one or more processing modules and perform the acts of: determining: (a) a total number of records in a set of distinct records contained in a database system; and (b) a total number of records in the set of distinct records in a second database cluster L, wherein the database system comprises a first database cluster H and the second database cluster L, and wherein the total number of records contained in the database system comprises the total number of records in the second database cluster L plus the total number of records in the first database cluster H; if the total number of records in the second database cluster L is greater than a target number of records in the second database cluster L, then iterating through each record in the set of distinct records, and, for each record in the second database cluster L: generating a random number; and using the random number to determine if the record should be moved from the second database cluster L to the first database cluster H; receiving a search request from a requester; and presenting, a search result containing one or more records of the set of distinct records to the requester.

In some embodiments, a method may comprise: in a set of distinct records in a database system, the database system comprising a first database cluster H and a second database cluster L, for each record of the set of distinct records, comparing the record to a white-list database; if the record is contained in the white-list database, placing the record in the first database cluster H; if the record is not contained in the white-list database, calculating a probability that the record will be accessed and (a) placing the record in the first database cluster H if the record is likely to be accessed, or (b) placing the record in the second database cluster L if the record is not likely to be accessed; receiving a search request from a requester; and presenting a search result containing one or more records of the set of distinct records to the requester.

In one embodiment, a method can comprise: determining an access history for a record in a set of distinct records in a database system, the database system comprising a first database cluster H and a second database cluster L, where each record in the set of distinct records is placed in one of the first database cluster H or the second database cluster L based on a likelihood of each such record being accessed; using the access history for the record in a predictive model to predict a future likelihood of the record being accessed; storing the record in one of the first database cluster H or the second database cluster L based at least on the future likelihood of the record being accessed; receiving a search request from a requester; and presenting a search result containing one or more records of the set of distinct records to the requester; wherein: the access history for the record is analyzed at one or more discrete time periods, the one or more discrete time periods including an immediately prior year.

In one embodiment, a method can comprise: for each record in a set of distinct records in a database system, the database system comprising a first database cluster H and a second database cluster L, where each such record in the set of distinct records is placed in one of the first database cluster H or the second database cluster L based on a likelihood of each such record being accessed: reviewing a set of past feature vectors for the record; counting the number of days that the set of past feature vectors for the record indicated that the record was available; translating the number of days into a newness factor; using the newness factor to determine a new feature vector for the record; using the new feature vector to determine whether to store the record in the first database cluster H or the second database cluster L; storing the record in the first database cluster H or the second database cluster L based at least in part on the new feature vector; receiving a search request from a requester; and presenting a search result containing one or more records of the set of distinct records to the requester.

In one embodiment, a method can comprise: receiving a request from a requesting party to produce a feature vector for a record, the feature vector being used to aid in placing the record in one of a first database cluster H or a second database cluster L; retrieving a first access history for the record at a first time period, the first access history indicating a number of times the record was accessed within the first time period that is a predetermined time period away from a current day; repeating retrieving one or more second access histories for the record for one or more additional time periods, each second access history indicating a number of times the record was accessed within the one or more additional time periods, each of which are different predetermined time periods away from the current day; generating the feature vector based on the first access history and the one or more second access histories of the record; and sending the feature vector to the requesting party.

In one embodiment, a method can comprise: for each record in a set of distinct records in a database system, the database system comprising a first database cluster H and a second database cluster L, where each record in the set of distinct records is to be placed in one of the first database cluster H or the second database cluster L based on a likelihood of the record being accessed of distinct records, for each record: determining if the record was placed in the second database cluster L for each smaller time period within a longer time period; calculating a total number of the smaller time periods within the longer time period that the record was placed in the second database cluster L; and using the total number of the smaller time periods to at least partially determine if the record should be stored in the first database cluster H or the second database cluster L; storing the record in either the first database cluster H or the second database cluster L based on the determination; receiving a search request from a requester; and presenting a search result containing one or more records of the set of distinct records to the requester.

In one embodiment, a method can comprise: accessing a query log which comprises click-through information and item-view information for a record in a set of distinct records in a database system, the database system comprising a first database cluster H and a second database cluster L; calculating a total click-through for the record by determining how many times the record was clicked during a time period; calculating a total item-view for the record by determining how many times the record received an item-view during the time period; using the total click-through for the record and total item-view for the record to store the record in either the first database cluster H or the second database cluster L; receiving a search request from a requester; and presenting a search result containing one or more records in the set of distinct records to the requester; wherein: the click-through information comprises information about every record in the set of distinct records that any user ever clicked on; and the item-view information comprises information about every record in the set of distinct records shown to any user as a result of a query submitted by such user.

In one embodiment, a system can comprise: one or more processing modules; and one or more non-transitory memory storage modules storing computing instructions configured to run on the one or more processing modules and perform the acts of: accessing a query log which comprises click-through information and item-view information for a record in a set of distinct records for each record in a set of distinct records in a database system, the database system comprising a first database cluster H and a second database cluster L; calculating a total click-through for the record by determining how many times the record was clicked during a time period; calculating a total item-view for the record by determining how many times the record received an item-view during the time period; using the total click-through and total item-view to store the record in either the first database cluster H or the second database cluster L; receiving a search request from a requester; and presenting a search result containing one or more records in the set of distinct records to the requester; wherein: click-through information comprises information about every record in the set of distinct records that any user ever clicked on; and the item-view information comprises information about every record in the set of distinct records shown to any user as a result of a query submitted by such user.

In one embodiment, a method can comprise: creating a mapping of a product to search terms on a first social media platform; at a first time period, analyzing a first popularity factor of the product on the first social media platform; at a second time period, different from the first time period, analyzing a second popularity factor of the product on the first social media platform; comparing the first popularity factor with the second popularity factor to create a first popularity trend signal; repeating analyzing the first popularity factor, analyzing the second popularity factor, and comparing the first popularity factor with the second popularity factor for each record in a set of distinct records in a database system, each record in the set of distinct records representing a different product, the database system comprising a first database cluster H and a second database cluster L; storing the record in either the first database cluster H or the second database cluster L using the first popularity trend signal; receiving a search request from a requester; and presenting a search result containing one or more records in the set of distinct records to the requester.

In one embodiment, a system can comprise: one or more processing modules; and one or more non-transitory memory storage modules storing computing instructions configured to run on the one or more processing modules and perform the acts of: creating a mapping of a product to search terms on a first social media platform; at a first time period, analyzing a first popularity factor of the product on the first social media platform; at a second time period different from the first time period, analyzing a second popularity factor of the product on the first social media platform; comparing the first popularity factor with the second popularity factor to create a first popularity trend signal; repeating analyzing the first popularity factor, analyzing the second popularity factor, and comparing the first popularity factor with the second popularity factor for each record in a set of distinct records in a database system, each record in the set of distinct records representing a different product, the database system comprising a first database cluster H and a second database cluster L; storing the record in either the first database cluster H or the second database cluster L using the first popularity trend signal; receiving a search request from a requester; and presenting a search result containing one or more records in the set of distinct records to the requester.

The approach to the hot/cold item prediction and prioritized index building tasks can be fully automated and can be configured to operate without human intervention and/or knowledgeable input. Occasionally, however, business decisions and logic can request the hot/cold status of certain products to be reset to a specific value. Two particular types of business decisions are white-list (that is, a list of products that are always "hot") and cold-ratio control (that is, to let the percentage of items that are predicted to be "cold" be equal to a specified value.)

The challenge is that such integration should not be dependent on the sub-task of hot/cold prediction itself, such that any future change in the prediction procedure becomes transparent.

The problem is therefore to devise a mechanism to implement white-list and cold-ratio control that does not rely on the implementation of the underlying hot/cold prediction procedure.

To address the problem, one solution is to treat the hot/cold prediction algorithm as a black box, and instead modify the input into the algorithm and output from the algorithm.

For products that belong to the white-list, we exclude them from the machine learning algorithm, and directly predict them as "hot." Considering that prediction and actual access pattern of each product will be re-used for future machine learning model re-training in the future, we can also set up a special flag reflecting whether the prediction of a particular product is a result of the white-list or not. The purpose is to exclude the impact of white-listed products, so that the machine learning model will not be misguided.

After the prediction is performed on the rest of the products, we can randomly select a sub-group of products that are predicted as "cold" and change the prediction label to "hot" such that the total number of "cold" products satisfies the cold-ratio control requirement.

By doing so, both goals of white-list and cold-ratio control are achieved. Furthermore, the procedure remains agnostic to how the underlying prediction algorithm works.

In the eCommerce industry, accesses to products sometimes show patterns of seasonality. For example, the interest in Halloween costumes often reaches its peak several weeks before Halloween, fades away after Halloween, and remains low until Halloween approaches the next year. Other types of seasonality can also exist. For example, information about taxes can have a peak in both April (when individual taxes are normally due) and in October (when individual taxes with tax extensions are due). Sporting goods have defined seasons where, for example, golf equipment is not popular in the winter months, while ski equipment is not popular in the summer months. Meanwhile, other products often become trending within a short period of time. For example, the release of a new movie on DVD or Blu-Ray, the release of a new video game, or the release of a new smartphone. The coexistence of both phenomena poses a challenge to the hot/cold prediction procedure, as both indicate a higher likelihood of products being accessed in the future, and the prediction procedure needs to capture both at the same time.

There may be a desire for an approach to capture both product seasonality and emerging trends and use both in a hot/cold prediction procedure.

One embodiment proposes to solve the problem as follows: instead of identifying the most suitable time windows for each product individually, use multiple time windows to capture seasonality and emerging trends simultaneously. The access pattern of products in each time window is used as one individual feature, and the machine learning algorithm can learn weights for each feature from the training data automatically.

Time window lengths can be determined in a variety of ways. Since the product index can be built daily in some embodiments, the smallest time window needed to capture what has happened since the last index was built is a daily time window. That is, an embodiment captures the product access information within the past 24 hours. In other embodiments, the product index can be built more often (such as hourly), so the smallest time period in those cases can be hourly. Longer time periods can be used as the next levels of granularity. In some embodiments, levels of granularity that are used can include three days, seven days, two weeks, one month, three months, six months, and one year.

The design of the hot/cold prediction procedure follows the hypothesis that if a product has recently been accessed by customers via various channels (including, but not limited to, sales, social media discussion, and click-throughs), it is more likely to be accessed again in the near future. The challenge, however, is that such hypotheses are biased against new items that have been cold for a long time. By definition, such items are very unlikely to have been accessed recently. As a result of the design of the prioritized index structure, they have a low likelihood of being predicted as hot or being placed in the hot database cluster. Thus in turn reduces the chance of the item being accessed in the future. Adopting multiple time window scales or randomly placing items in the hot database cluster partially alleviates the problem, but it can be desirable to have other methods of placing items in the hot or cold databases.

The solution of one embodiment is to incorporate the newness of a product by counting the number of days that its feature vector has appeared in a specified time period. In one embodiment, the specified time period is thirty days, but this time period can be set to any reasonable value.

Feature vectors are constantly being constructed for all products available in a particular eCommerce system. The above-referenced signal captures how many days a product has been available in the system within the specified time period and reflects the relative newness. This approach can provide more accurate characterization of product newness than looking up the product's creation data in the system because a product could have been added to a system in the past, but later became unavailable. When the product becomes newly available, it can be desirable to not the product's newness.

To capture the coldness of a product, the actual access patterns of a product can be analyzed. Thereafter, the coldness of any product can be calculated as the number of days the product was cold within a predetermined time period.

For eCommerce websites, the two most typical behaviors, searching and browsing, both have direct a customer to a result page containing multiple products for further inspection by the customer. On a result page, products are shown to customers, who in turn click any number of them. It can be assumed that if a product has been seen and/or clicked previously, it is more likely to be accessed again in the future. Therefore information about products being shown and/or clicked can be indicative to the hot or cold status of products, apart from their sales figures.

The challenge can be that a product being shown and clicked represents two different types of behavior. When a customer clicks on a product, he shows active interest in the product. On the other hand, when a customer browses a list of products, he is only passively exposed to the products. Therefore, it can be desirable to distinguish between shown and clicked and glean that data from a search engine log.

Another factor related to the hot/cold status of product is the position of a product on a search result list when the product is shown to a customer. Previous research has shown that pages shown at the top positions of a result page have a higher likelihood of being clicked by users for further inspection. The same rationale can apply to product search engines, where customers are more likely to click on products shown at the top of result pages. When deciding signals to use for predicting a product's hot/cold status, it can be desirable to account for this behavior.

Therefore, one goal may be to devise an approach of collecting, from the search engine production log data, information of products being shown and/or clicked, and convert the position-dependent information into signals that can be used by a predictive model to predict the future hot/cold status of products.

One way to address the aforementioned challenges is to extract click-through and item-view signals from the search engine query log. The search engine query log records each user's browsing session as well as the complete search history. More precisely, each query can be presented as a 2-tuple:

(shown_product_list, clicked_product_list) where:
shown_product list=(shown_ID_1, shown_ID_2, . . . ), and
clicked_product_list=(clicked_ID_1, clicked_ID_2).

Shown_product_list includes all product IDs that are shown as a result of a query, in the order of their positions on the results page. Clicked_product_list can contain the product IDs that a customer clicked on the result page. Thus, clicked_product_list is a subset of shown_product_list.

Given all the search engine log entries during a time window of interest, one can create a dictionary that records how many times a product has been clicked. One can also create a series of dictionaries, each of which details how frequently a product has been shown at the first k positions. The value of k can be decided by end users. In one embodiment, k can be a power of 2, up to 16, with 16 chosen because a default number of search results can be 16 in one embodiment.

By considering both the active behavior (clicking) of users in addition to the impressions of all products shown on the shown result page, one gets a more informed impression as the popularity of the product. In addition, by distinguishing between different positions where products are shown and using multiple product groups to capture the difference, finer control of the input results. A further result is a more accurate predictive model because the predictive model will receive better inputs.

Social media has been used as a platform for product marketing that targets internet users. Most forms of social media provide engagement statistics of product entities. For example, the number of Facebook "likes", the number of Pinterest "pins" and the number of Twitter "tweets" can be used to estimate the popularity of products. It has been theorized that the higher popularity that a product has on social media, the more likely it is that the product will be accessed by customers. Therefore, one may wish to utilize information from social media as signals to increase the accuracy of hot/cold predictions.

One problem that can arise is that metrics are not directly comparable across different social media sites, due to the different sizes of the user base and distinct audience characteristics. Furthermore, popularity metrics themselves are time-agnostic, which can make it difficult to determine when any certain product has reaches a certain popularity.

A goal is to devise a platform-transparent, time-aware aggregation mechanism to unify product popularity signals from multiple social media sites and use the signal to improve the accuracy of hot/cold predictions.

A way to solve the above-described problem is to focus on trendiness of products rather than the popularity of products. On each social media site, trendiness can be modeled as the normalized increase of product popularity from the previous time period, in a manner analogous to a first derivative. This measure is self-adjusting according to baseline values that are distinct to each site, and is therefore comparable, aggregatable over multiple social media sites. A unified signal value can then be calculated as the aggregation of trendiness over all social media sites.

Figure 2:
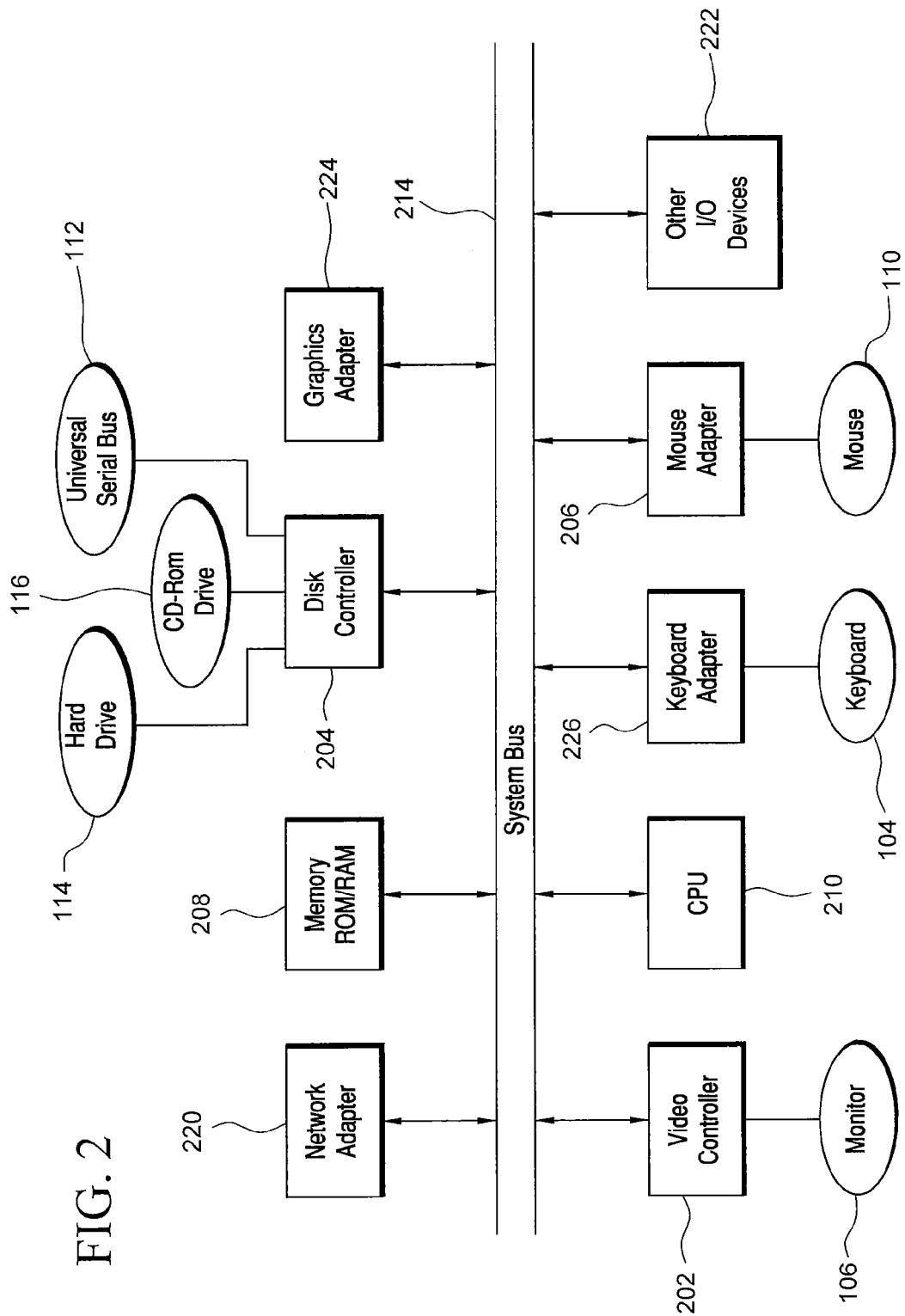
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-Ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-Ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 may or may not contain each of the items shown in FIG. 1 or 2 or may in fact contain multiple of each of the items shown in FIG. 1 or 2. For example, certain implementations of computer system 100 may not contain a CD-ROM, DVD, or Blu-Ray drive 116. Other implementations of computer system 100 may contain two CD-ROM, DVD, or Blu-Ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD).

Figure 3:
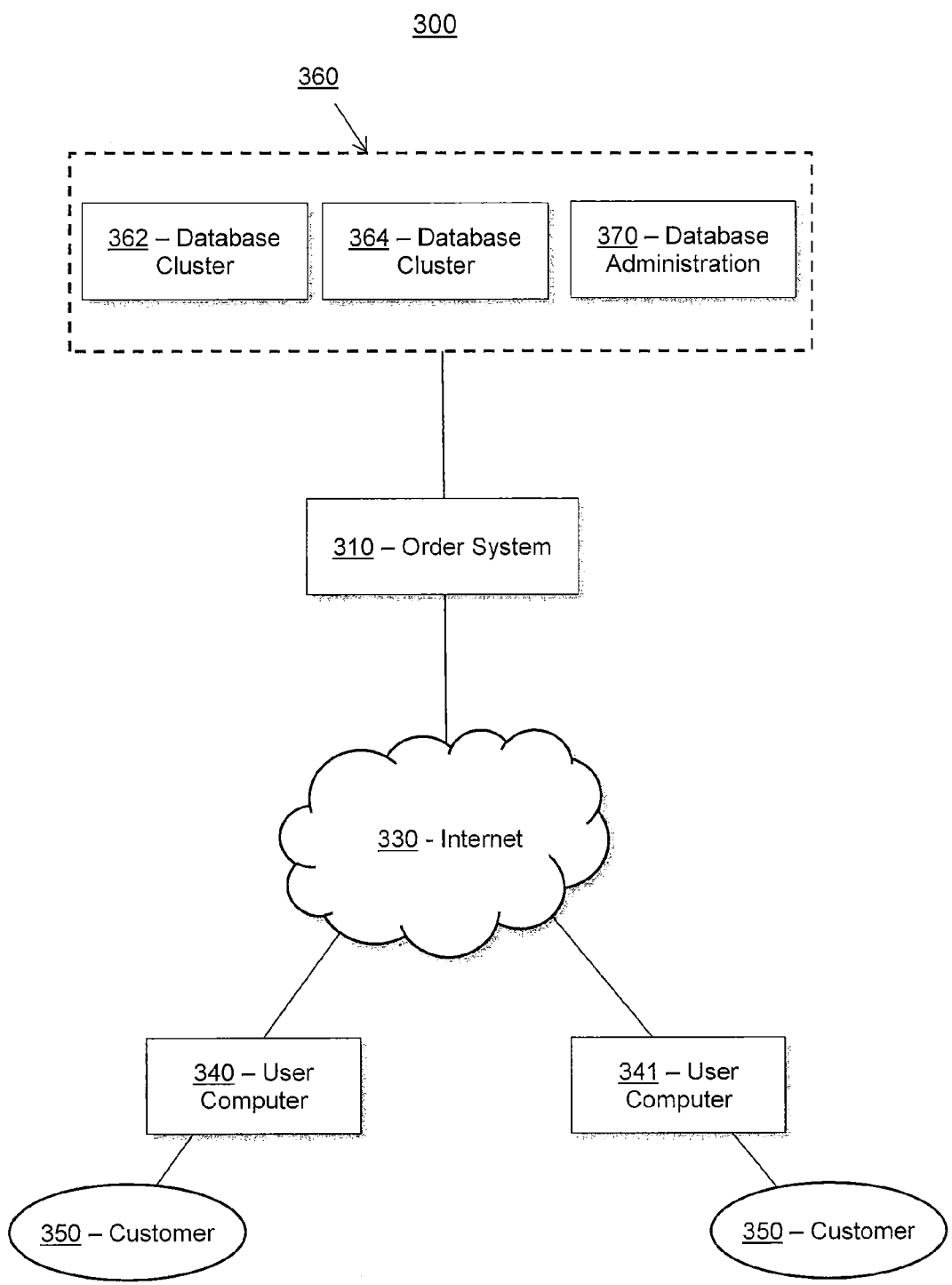
FIG. 3 illustrates a block diagram of an exemplary online retail system, portions of which can be used to create a prioritized product list for e-commerce, according to an embodiment.

Turning ahead in the drawings, FIG. 3 illustrates a block diagram of an exemplary online retail system 300, portions of which can be employed for determining a prioritized product index, according to an embodiment. Online retail system 300 is merely exemplary of a system in which an online retailer can receive and fulfill online orders, and embodiments of the online retail system and elements thereof are not limited to the embodiments presented herein. The online retail system and elements thereof can be employed in many different embodiments or examples not specifically depicted or described herein. In some embodiments, certain elements or modules of online retail system 300 can perform various procedures, processes, and/or activities. In other embodiments, the procedures, processes, and/or activities can be performed by other suitable elements or modules of online retail system 300.

In a number of embodiments, online retail system 300 can include a database system 360. In various embodiments, database system 360 can include one or more components, such as database clusters 362 and 364. Database system 360 can also include a database administration module 370, which can serve to perform certain tasks on database clusters 362 and 364, described in detail below. In some embodiments, online retail system 300 can include an order system 310. Order system 310 can be a computer system, such as computer system 100 (FIG. 1), as described above, and can each be a single computer, a single server, or a cluster or collection of computers or servers, or a cloud of computers or servers. Order system 310 can be separate from database system 360. In such a case, order system 310 can be a "front-end" of a system that is configured to receive input from a user. Order system 310 would then forward relevant information (such as search terms) to database system 360. In other embodiments, order system 310 is integral with database system 360. In some embodiments, whether or not order system 310 is integral with database system 360 is not noticeable to customers 350 and 351. Customers 350 and 351 may merely access a web site using a browser or a user portal using an app and be presented with a user interface, with the underlying details as to the layout of retail system 300 being irrelevant to the experience of customers 350 and 351. It also should be understood that, while only two customers 350 and 351 are illustrated in FIG. 3, retail system 300 can be capable of handling many thousands of customers simultaneously.

In various embodiments, order system 310 can be in data communication through Internet 330 with user computers (e.g., 340, 341). User computers 340-341 can be desktop computers, laptop computers, smart phones, tablet devices, and/or other endpoint devices, which can allow customers (e.g., 350-351) to access order system 310 through Internet 330. In various embodiments, order system 310 can host one or more websites, such as through one or more web servers. For example, order system 310 can host an electronic commerce (eCommerce) website that can allow customers (e.g., 350, 351) to browse and/or search for products, to add products to an electronic shopping cart, and/or to purchase products by completing an online order, in addition to other suitable activities.

In various embodiments, a customer (e.g., 350, 351) uses a user computer (e.g., 340, 341) to access order system 310. In one typical scenario, a customer desires a certain product or category of product and submits a search request on order system 310.

When a search request is submitted to order system 310, order system 310 can access database system 360. Database system 360 can be a computer system, such as computer system 100 (FIG. 1) described above, and can be a single computer, a single server, or a cluster or collection of computers or servers, or a cloud of computers or servers.

Database system 360 can contain information about products available for purchase on online retail system 300. This information can include details about the product name, category, description, cost, availability, and the like. The information can contain text and can include multimedia, such as photos, drawings, and videos.

Database system 360 can be indexed using one of a variety of different indexing techniques, such as a bitmap index, a dense index, a sparse index, or a reverse index. Database system 360 can include one or more tables, each of which includes one or more fields or cells, one or more rows, and one or more columns.

As the amount of information stored in database system 360 grows, the performance of database system 360 may begin to slow. An eCommerce database system with information about 1,000 products will be much smaller than a database system with information about 10,000 products. Below a certain size, a user may not notice a difference in performance. In other words, a search of a database system with information about 10,000 products may be so fast that it is imperceptibly slower than a search of a database system with information about 1,000 products. However, some entities may use database systems with database systems that are large enough so that searches can be perceived as being slow. For some entities, this may occur in a database system with information about approximately 100 million products. This situation may differ depending on the equipment being used by the entity, so an entity with smaller processing capabilities may find a database system for up to 1 million entries to be too large.

In some embodiments, database system 360 can divide all products available for sale into two clusters, a first or "hot" database cluster 362 and a second or "cold" database cluster 364. The database clusters can be configured such that more popular search terms lead to the usage of the "hot" cluster and less popular search terms lead to the usage of the "cold" cluster. In some embodiments, the hot and cold database clusters are configured such that a large percentage of searches (approximately 99%) occur in the hot database cluster. Research may be used to discover an optimal division between the hot database cluster and the cold database cluster. In one embodiment, approximately 60% of items are placed in the hot database cluster, and the remaining items are placed in the cold database cluster. Due to the imbalanced nature of product searching of e-commerce databases, even though only 60% of items are in the hot database cluster, 99% of searches only require access to the hot database cluster. Because most searches will take place in the hot database cluster, the cold database cluster can be hosted using less powerful (and therefore, less expensive) equipment than the hot database cluster, as described in more detail below. Each of hot database cluster 362 and cold database cluster 364 can have an associated index of one or more fields.

Figure 4:
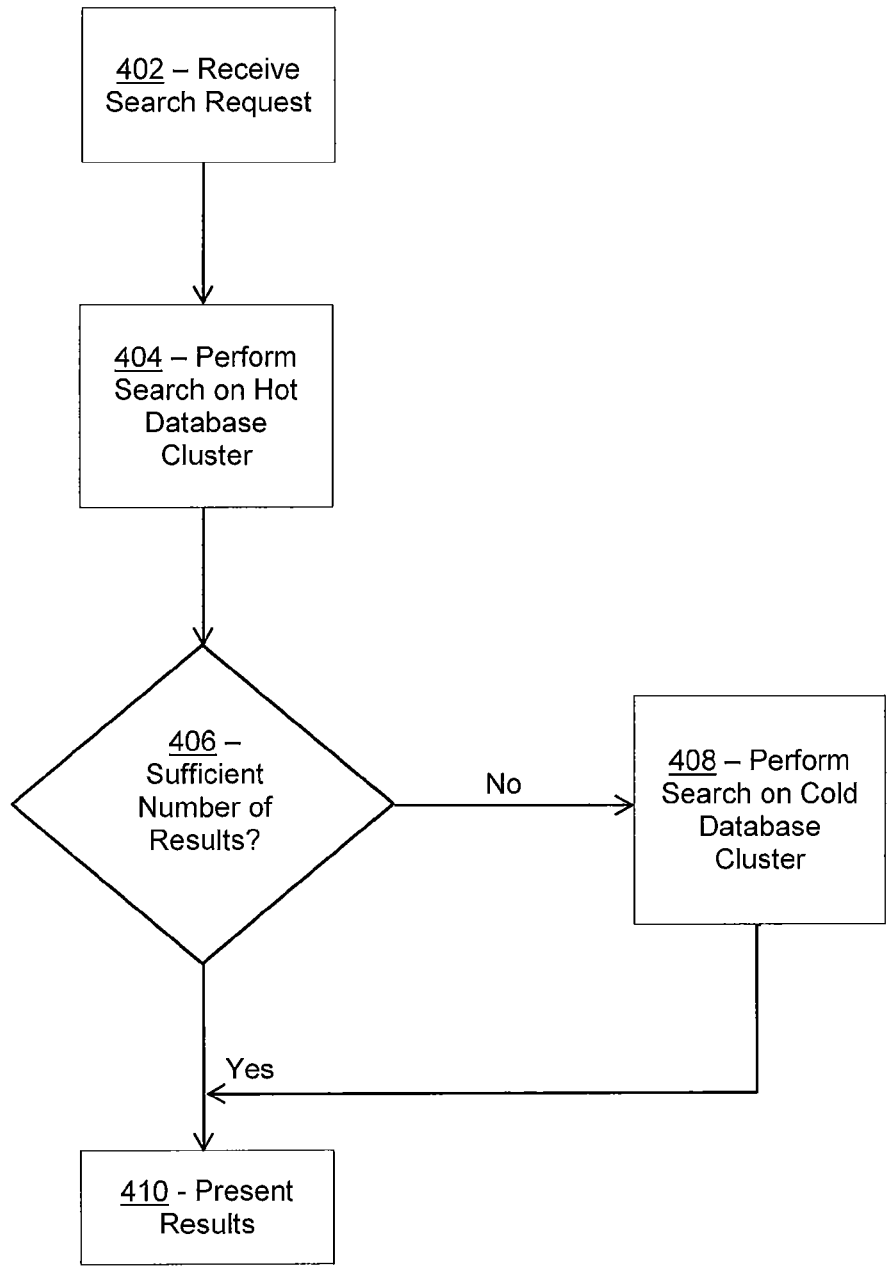
FIG. 4 illustrates a flowchart for an exemplary method of performing a search request, according to an embodiment.

Turning ahead in the drawings, FIG. 4 is a flowchart illustrating a method 400 for conducting a search, according to an embodiment. The search being performed can be performed on a network 300 (FIG. 3). Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, method 400 can be implemented by online retail system 300 (FIG. 3).

Referring to FIG. 4, in some embodiments, method 400 can include a block 402 of receiving a search request. A search request can be submitted by a customer 350 (FIG. 3) using user computer 340 (FIG. 3). For example, customer 350 can access a web site that has a search box, or customer 350 can enter a query into an "app" on a portable electronic device, such as a smartphone, a tablet, or a personal digital assistant (PDA). Customer 350 would enter the search term that he is interested in into the search box. In other embodiments, search terms can be presented in other ways. For example, a hyperlink can contain search terms. Such a hyperlink with search terms can be accessed by customer 350 in a variety of different ways, such as via an email, a post from Facebook (or other social media site), link on a related website, an advertisement on another site, and the like.

In a number of embodiments, method 400 can continue by including a block 404 of performing the search request on a hot database cluster. In some embodiments, such a block 404 can be performed in a variety of different ways known in the art or developed in the future. For example, terms can be extracted from the search request (at block 402), and invalid characters could be stripped out of the request. In some embodiments, a search query is created from the search request. Once the search query is created from the search request, the search query can be executed in a variety of different manners. In some embodiments, a Structured Query Language (SQL) command is created that will result in the performing of a search. A variety of other methods could be used to perform a search.

The search is performed on a hot database cluster, such as hot database cluster 362. In some embodiments, the hot database cluster is indexed, such that the search request uses the index to perform the search operation.

In some embodiments, there are two different database clusters, each operating on a different database server. In one embodiment, one database cluster can be called a "hot" database cluster, and the other database cluster can be called a "cold" database cluster. In one embodiment, the hot database cluster is stored on a hot database server and the cold database cluster is stored on a cold database server. Each of the hot and cold database servers can comprise a set of database processing modules and a set of database storage modules. It should be understood that a set of modules can include one module or more than one modules. A database processing module can comprise one or more central processing units (CPUs), such as an Intel Xeon processor, an Intel Core processor, an AMD Opteron processor, an AMD Phenom processor, or the like. A database storage module can comprise one or more memory modules containing items capable of storing data, such as Random Access Memory (RAM) modules, solid-state drives (SSDs), hard drives, and the like.

In one embodiment, the hot database server can have greater processing capabilities than the cold database server. The greater processing capabilities can be present in either the database processing module or the database storage module. For example, the hot database server can have a database processing module that contains more processing cores than the database processing module for the cold database server. The hot database server can contain faster processing cores than the cold database server. For example, the hot database server can contain two processors, each with eight processing cores, while the cold database server has a single processor with eight processing cores. In another example, the processing cores for the hot database processing module can operate at 3.5 GHz, while the processing cores for the cold database processing module can operate at 3.0 GHz. In one embodiment, the hot database processing module can have greater memory storage than the cold database processing module. For example, in one embodiment, the hot database processing module can include 256 GB of RAM while the cold database processing module includes 32 GB of RAM. In one embodiment, the hot database storage module can have faster mass storage than the cold database storage module. For example, the hot database storage module can use solid state drives or faster hard drives than those used in the cold database storage module. The processing capabilities also can refer to the connection speed to the hot database server versus the connection speed of the cold database server. For example, the hot database server can be connected to the Internet using a faster connection than the cold database server.

The greater processing capabilities of the hot database server allow the hot database server to perform searches more quickly than the cold database server. The trade-off is that greater processing capabilities have a greater financial cost. For example, faster processors are usually more expensive than slower processors. Solid state drives are usually more expensive than hard drives. By separating the hot database server from the cold database server, an entity can reduce costs by not being forced to purchase more expensive hardware for their entire database, only using the greater processing capabilities on a portion of their database—the portion being used for most of the searches.

In one embodiment, after the search is performed on the hot database server (block 404), the search results can be analyzed (block 406). For example, the number of results returned from a search of the hot database server can be determined. If the number of results from the search of the hot database server is greater than a minimum number of results, then the results are presented to the requester (block 410). In some embodiments, the minimum number of results can be predetermined and can be ten. This minimum can be different in other embodiments. The presenting of search results to the requester will be discussed in greater detail below.

If the number of results is less than a minimum number of results, other steps can be performed. In some embodiments, the search request is performed in the second database cluster (the cold database cluster, running on the cold database server) using a second index (block 408). Thereafter, the search results from the search of the hot database cluster are combined with the search results from the search of the cold database cluster. Then the combined search results are presented to the user.

In some embodiments, if the number of results is less than a number of results, the search request is examined in greater detail. There can be a separate database table including a list of pre-selected search terms. The search request can be compared to the list of pre-selected search terms. If the search request is found within the list of pre-selected search terms, then the results from the search of the hot database server can be presented to the user. In some embodiments, terms contained in the list of pre-selected search terms can be considered a "head query."

There are several different reasons why a term can be contained in a list of pre-selected search terms. In an electronic commerce situation, some terms may be considered "hot" or otherwise important whether or not a search of that term produces many results. For example, a new movie being released on DVD or Blu-Ray may produce only three results, but because the movie is new and popular, it is expected to be a popular search term. In such a case, an additional search of the cold database may not be considered necessary, and the additional time required to perform a search of the cold database may not be desirable. Therefore, search terms related to the new movie can be placed in the pre-selected search term table.

In some embodiments, the pre-selected search term table can be populated based on historical search queries. For example, it may be the case that certain search terms may be popular enough to be a search term fairly often. Yet a search of that term may result in fewer than a pre-determined number of search results. In such a case, the search term can be placed in the pre-selected search term table.

The information stored in each of the hot and cold database clusters can include information that would be helpful to a possible consumer of the product. Information such as the name of the product, a description of the product, photos or other images of the product, videos concerning the product, and available options of the product can be contained in the hot and cold database cluster. There also can be information regarding the availability of the product, such as whether or not the product is in stock and/or an expected availability date for the product.

In some embodiments, entries in the database system are categorized such that some entries are in a first database cluster and some entries are in a second database cluster. The entries can be divided such that the first database cluster is considered the "hot" database cluster and the second database cluster is considered the "cold" database cluster. In an electronic commerce environment, the hot database cluster can contain information about items that are more likely to be search or purchased than the cold database cluster. For example, an electronic commerce provider that sells movies can contain information about blockbuster movies from the 2010s in the hot database cluster, while information about obscure movies from the 1950s that are not as popular can be in the cold database cluster. In such a situation, the hot database cluster contains information with a first priority while the cold database cluster contains formation with a second priority. In this situation, the first priority would be higher than the second priority.

In some embodiments, there can be a method of placing records in the hot database cluster or the cold database cluster. There can be an existing database that one wants to separate into a hot database cluster and a cold database cluster. Or there otherwise can be a need to group records such that the records are placed either in a hot database cluster or a cold database cluster.

After block 406 and/or block 408, presenting of the search results to the user occurs in block 410. The presenting of results can occur in one of a variety of different manners, presently known in the art (e.g., video or electronic display, printing a paper copy, etc.) or developed in the future. The search results can be forwarded to order system 310 (FIG. 3). Order system 310 (FIG. 3) is typically configured to display search results in a predetermined manner. For example, the first ten search results can be presented in a table along with pertinent information, such as the name of the product, photos of the products, and price of the product, or a hyperlink that a user can access to view additional information. It should be understood that an embodiment may not be limited to presenting 10 search results. The number of search results can be user-selectable, such that if a user desires to view 16, or 32, or 50, or 100 results per page, they are able to do so. In some embodiments, order system 310 (FIG. 3) can be pre-configured to show a different number of search results per page.

The presentation to the user can be dependent on user computer 340 (FIG. 3). For example, while a user on a laptop or desktop computer with a larger monitor may have their results presented via a web page, a user on a tablet or a smartphone may have their search results presented within a specially designed app.

Figure 5:
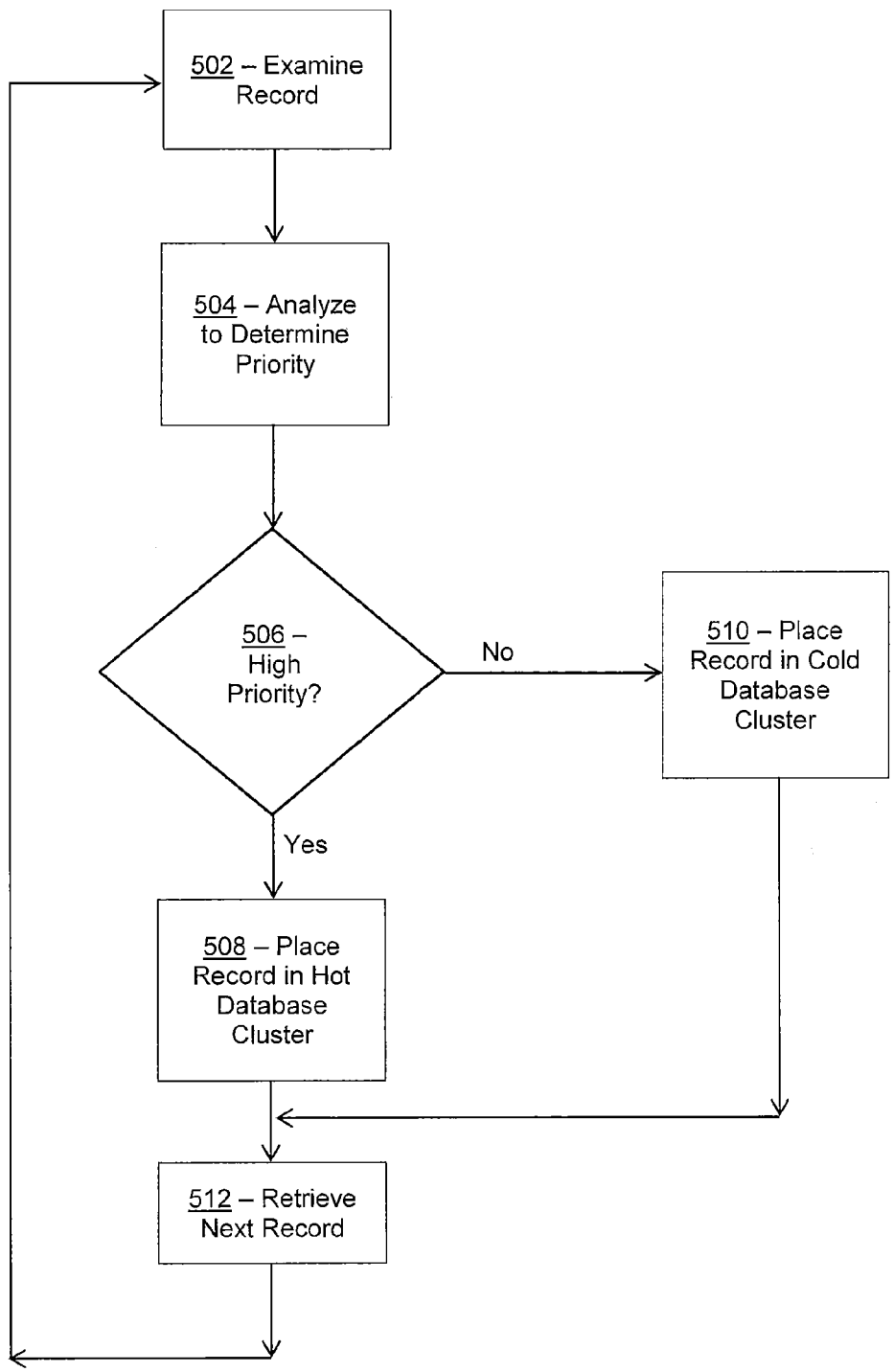
FIG. 5 illustrates a flowchart for an exemplary method of placing records in databases according to various criteria, according to an embodiment.

Turning ahead in the drawings, FIG. 5 is a flowchart illustrating a method 500 for grouping records into a first database cluster and a second database cluster. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in the order presented. In other embodiments, the procedures, the processes, and/or the activities of method 500 can be performed in any other suitable order. In still other embodiments, one or more of the procedures, the processes, and/or the activities of method 500 can be combined or skipped. In some embodiments, method 500 can be implemented by online retail system 300 (FIG. 3).

Each record in the group of records is examined individually (block 502). In an e-commerce situation, each record in a database can contain information regarding a single stock keeping unit (SKU). Thus, there can be multiple results for a search for a product, to account for color, size, and other options. Next, each record is analyzed to determine the priority of the record (block 504). Then, a decision block determines the action depending on if the record should receive a first priority or a second priority (block 506). Those records that receive a first priority are placed in the first database cluster (e.g., the hot database cluster) (block 508), and the records that receive a second priority are placed in a second database cluster (e.g., the cold database cluster) (block 510). Then, the next record is retrieved (block 512), and the record is examined (block 502). Thereafter, one or more indexes are built for the first database cluster, and an index is built for the second database cluster. The index is created in one of a variety of manners known in the art. It should be understood that a database index can be used to enhance the speed of searches for the associated database.

There can be a variety of different ways to determine if each record receives a first priority or a second priority. In some embodiments, the analysis to determine priority is, in essence, a prediction as to the future popularity of the record—whether or not each record will be the result of a search request by a user. In some embodiments, an analysis of historical data can be performed to calculate a popularity factor for each record. Once the popularity factor is calculated for each record in the set of records, the records can be grouped into the first database cluster and the second database cluster. The grouping can take many different forms. For example, records with a popularity factor greater than a predetermined value X can be placed in the first database cluster, and the remaining records can be placed in the second database cluster. In some embodiments, instead of a predetermined value being used, the records can be grouped such that a percentage of records are placed in the first database cluster, and the remaining records are placed in the second database cluster. In some embodiments, the percentage of records placed in the first database cluster is 60%. In some embodiments, testing is done on the first and second database clusters to dynamically calculate a desired percentage of records placed in the first database cluster.

In some embodiments, a previous status for the record is among the items being considered when analyzing the historical data. For example, if a particular record was placed in the hot database cluster the previous time this algorithm was performed, such a status can be strongly considered in calculating the popularity factor for the record. On the other hand, it should be understood that, in some cases, it may not be desirable for the previous status to be completely determinative of the popularity factor; otherwise, an item might never move from the first database cluster to the second database cluster.

In some embodiments, multiple iterations can be used to analyze the historical data. For example, the algorithm presented in FIG. 5 can be executed daily (or some other desired time period), and the calculated popularity factor for one day is aggregated in some manner with the calculated popularity factor for the previous day.

In some embodiments, a machine learning algorithm can be used to perform the analysis and calculate the popularity factor for each distinct record in the set of distinct records. In some embodiments, a supervised machine learning algorithm can be used to analyze each record in the set of distinct records and compare the records to the desired output. The desired output can be, for example, the criteria set forth earlier, where approximately 99% of searches use only the first (hot) database cluster. Inputs into the machine learning algorithm can include one or more feature vectors that can be relevant to the items in the database. For example, in an eCommerce environment, feature vectors can include information related to items important in a virtual retail environment, such as previous sales in a certain time period. The feature vectors can be used to provide additional input to the machine learning algorithm to more accurately place items into the first database cluster or the second database cluster.

Figure 6:
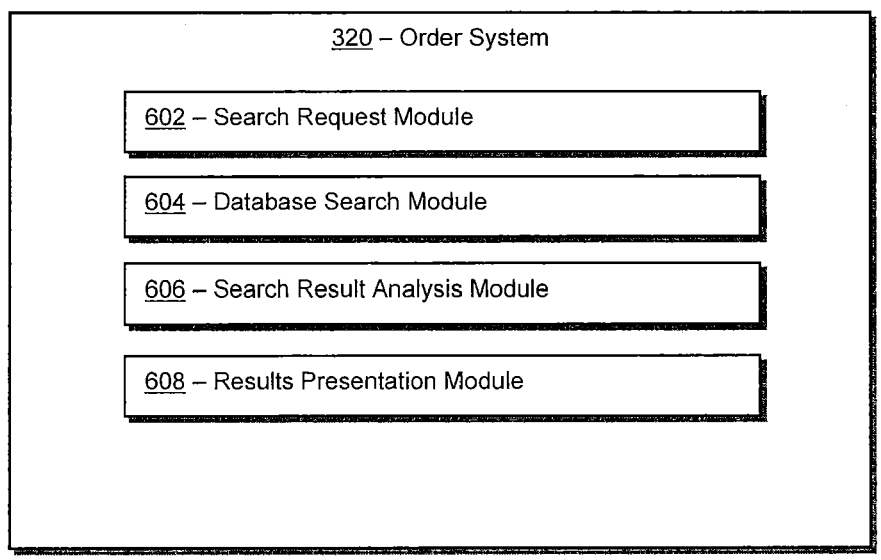
FIG. 6 illustrates a block diagram of an exemplary order system, according to an embodiment.

Turning ahead in the figures, FIG. 6 illustrates a block diagram of order system 310 (FIG. 3). Order system 310 is merely exemplary and is not limited to the embodiments presented herein. Order system 310 can be employed in many different embodiments or examples not specifically depicted or described herein. In some embodiments, certain elements or modules of order system 310 can perform various procedures, processes, and/or acts. In other embodiments, the procedures, processes, and/or acts can be performed by other suitable elements or modules.

In a number of embodiments, order system 310 can include search request module 602. In certain embodiments, search request module 602 can perform block 402 (FIG. 4) of receiving a search request from a customer or user.

In some embodiments, order system 310 also can include a database search module 604. In certain embodiments, database search module 604 can perform block 404 (FIG. 4) of performing the search request on a hot database cluster.

In various embodiments, order system 310 further can include a search result analysis module 606. In certain embodiments, search result analysis module 606 can perform block 406 (FIG. 4) of determining if the results from database search module 604 is greater than a minimum number of results.

In various embodiments, order system 310 additionally can include results presentation module 608. In certain embodiments, results presentation module 608 can perform block 410 (FIG. 4) of presenting search results to the requester.

Figure 7:
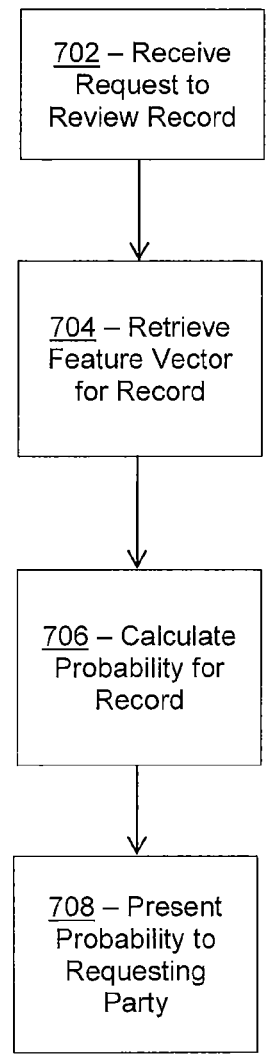
FIG. 7 illustrates a flowchart for using a machine learning module to predict the likelihood of an item being the result of a search, according to an embodiment.

Turning ahead in the drawings, FIG. 7 is a flowchart illustrating the operation of a method 700 of using a machine learning model to predict the likelihood of an item being the result of a search. Method 700 is merely exemplary and is not limited to the embodiments presented herein. Method 700 can be employed in many different embodiments or examples not specifically depicted or described herein. In some embodiments, the procedures, the processes and/or the activities of method 700 can be performed in the order presented. In other embodiments, the procedures, the processes, and/or the activities of method 700 can be performed in any other suitable order. In still other embodiments, one or more of the procedures, the processes, and/or the activities of method 700 can be combined or skipped. In some embodiments, method 700 can be implemented by online retail system 300 (FIG. 3).

In some embodiments, the steps taking place in FIG. 7 may occur as a part of block 506 of FIG. 5. In other words, FIG. 7 can be describing how it is determined that a particular record is determined to be a high priority. Thereafter, the results of block 506 determine whether a record is placed in a hot database cluster (block 508) or placed in a cold database cluster (block 510).

A request is received to analyze a particular record (block 702). A feature vector is retrieved corresponding to the record (block 704). In some embodiments, the feature vector does not contain label information concerning historical results. Using a predictive model (the creation of which is detailed below, in conjunction with FIG. 8), together with the feature vector, a prediction is made as to the probability that a particular record will be searched (block 706). In an eCommerce environment, each particular record corresponds to a product. Thus, the probability that a record will be searched corresponds to the probability that a particular product will be searched. The probability is presented to the requesting party (block 708).

The probability can comprise a value that indicates the likelihood of the particular record being searched. In some embodiments, the value can range from 0 to 1. In some embodiments, there can be a threshold value. When the probability is above the threshold value, it can be concluded that the record is high priority and is likely to be searched (see block 506; FIG. 5). Therefore, the record can be placed in the hot database cluster (block 508; FIG. 5). Otherwise, when the probability is equal to or below the threshold value, it can be concluded that the record is low priority and the record can be placed in the cold database cluster (block 510; FIG. 5).

The threshold value can be predetermined. In some embodiments, a threshold value of 0.5 can be used. In some embodiments, a different value may be used that has been empirically shown to be a more accurate predictor of whether or not a record will be accessed. In some embodiments, the threshold value can be determined dynamically during the process of creating a predictive model detailed below.

The overall goal of choosing a threshold value is that the number of accesses to the cold database cluster should be as small as possible. As described above, in an ideal situation, the records in the database are structured such that nearly all queries only require access to the hot database cluster. In an eCommerce situation, due to the overwhelming popularity of certain products and non-popularity of other products, over 95 percent of searches occur on only 50 percent of the items. A goal of 100% searches being of the hot database cluster may not be practicable—if it were possible, an eCommerce company would not even bother with stocking or tracking those products that are never the result of a search or are never purchased. However, it can be a desirable and attainable goal for 99 percent of the searches to only require a search of the hot database cluster. In some embodiments, the threshold value is chosen to meet that 99 percent goal.

The method presented in FIG. 7 can be performed on an ad hoc basis for selected records. In another embodiment, the method presented in FIG. 7 can be performed as a part of a systematic process of going through all the records in a database to divide the records between a hot database cluster and a cold database cluster.

Figure 8:
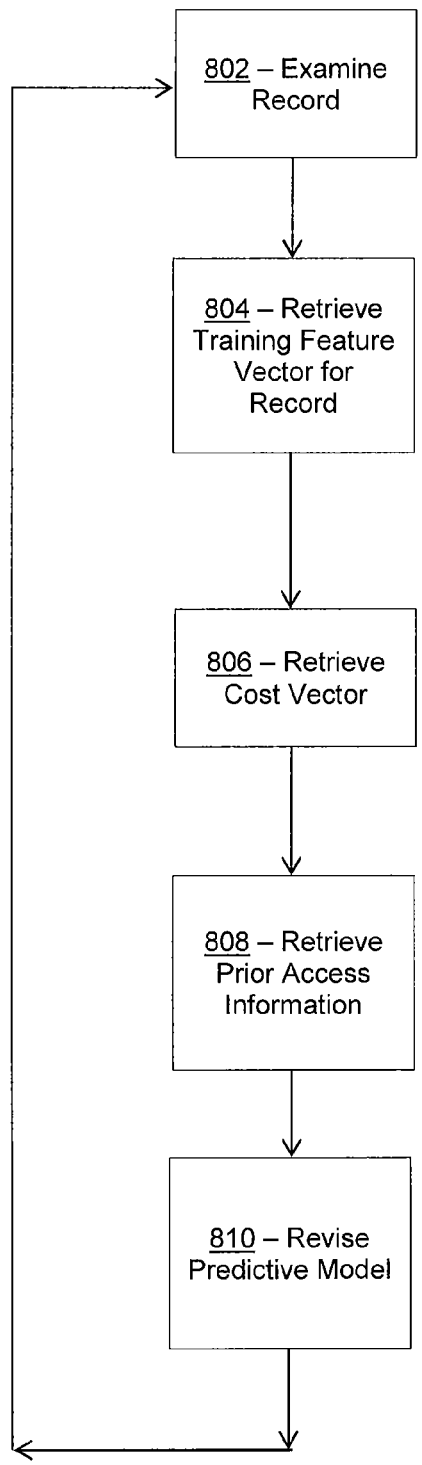
FIG. 8 illustrates a flowchart for an exemplary method of training a machine learning algorithm, according to an embodiment.

Turning ahead in the drawings, FIG. 8 is a flowchart illustrating the operation of a method 800 of training a machine learning algorithm to create a predictive model to predict the likelihood of an item being the result of a search. Method 800 is merely exemplary and is not limited to the embodiments presented herein. Method 800 can be employed in many different embodiments or examples not specifically depicted or described herein. In some embodiments, the procedures, the processes and/or the activities of method 800 can be performed in the order presented. In other embodiments, the procedures, the processes, and/or the activities of method 800 can be performed in any other suitable order. In still other embodiments, one or more of the procedures, the processes, and/or the activities of method 800 can be combined or skipped. In some embodiments, method 800 can be implemented by online retail system 300 (FIG. 3).

The method is performed on a group of records contained in a database cluster. Each record in the group of records is examined individually (block 802). In an eCommerce database, each of the records would contain information about a different item for sale. This information would include information that is typically stored for an item, such as a unique item identification code, the name of the product, a description of the product, the price of the product, and photos of the product. A training feature vector associated with the record is retrieved (block 804). The training feature vector contains information specific to the record. The training feature vector may include information such as prior sales history, prior access history, when the product became available, and the like. A cost vector is retrieved (block 806). The cost vector includes information about the costs of various types of errors. For example, the cost vector may contain two different types of information, the cost of a Type I error (e.g. a false positive), and the cost of a Type II error (e.g., a false negative).

As discussed above, a Type II error is undesirable. The result of a Type II error is that an item that should be in the "hot" database cluster is instead placed in the "cold" database cluster. Several negative events may occur due to an item being wrongly place in the cold database cluster in an eCommerce situation. With reference to FIG. 4 and the accompanying description, when a search of the database occurs, the search takes place first in the hot database cluster. Only in certain circumstances (such as when there are an insufficient number of results from a search of the hot database cluster) is the cold database cluster ever accessed. Thus, if an item is placed in the cold database cluster, a user performing a search may never see the item. In the instance where a user is intent on getting that specific item, the user may get the erroneous idea that a particular electronic retailer does not stock the item and may therefore end up purchasing the item from a different retailer. The lack of sales of a particular item from a retailer may lead to the manufacturer no longer selling the item on a eCommerce website because sales from the eCommerce website is too low. Even in situations where the item is eventually found in the cold database cluster, negative effects may occur.

For example, as discussed above, searches of the cold database cluster may be slower, because the cold database cluster is hosted on slower computer hardware. Therefore, a user may become under the impression that a particular eCommerce website is slow and be predisposed to not use the particular eCommerce website again in the future.

Thus, the cost vector can assign a much higher cost for a Type II error than for a Type I error. This cost vector can be assigned manually, with the results being analyzed later to determine if the cost vector is accurate. In another embodiment, the cost vector can be modified by the predictive model, depending on later results.

Prior access information can be retrieved (block 808). Prior access information can mean information regarding, in an eCommerce situation, how many times a particular item was returned as a search result in a particular time period. The time period can vary depending on the situation. In some embodiments, a time period consisting of a single day can be used.

In some embodiments, the predictive model can be modified (block 810). A variety of situations can occur in this situation. In some embodiments, a prediction for a previous day is contained in the training feature vector. Thereafter, the prediction for a previous day can be compared with the prior access information. If an item was predicted to be accessed by the predictive model and if it was accessed, that information can serve as a positive reinforcement of the predictive model. Conversely, if a product was predicted to be accessed, but if it was not accessed, that information can serve as a negative reinforcement of the predictive model. In some embodiments, a single day's worth of data might not be enough to result in the revision of the predictive model. But several days in a row of an item being placed in the hot database cluster, but not being accessed, could result in a change to the predictive model.

In some embodiments, block 810 uses a MetaCost algorithm in conjunction with a cost-insensitive machine learning algorithm to revise the predictive model. The MetaCost algorithm was created by Pedro Domingos and describes how to change a cost-insensitive machine learning algorithm into a cost sensitive machine learning algorithm by using a MetaCost procedure. The MetaCost procedure operates independently of the cost-insensitive machine learning algorithm. The MetaCost procedure can treat the cost-insensitive machine learning algorithm as a black box, requiring no knowledge of the functioning of the cost-insensitive machine learning algorithm and without changing the cost-insensitive machine learning algorithm.

The cost-insensitive machine learning algorithm can be one of a variety of different machine learning algorithms. In one embodiment, the cost-insensitive machine learning algorithm is a supervised machine learning algorithm. The supervised machine learning algorithm can be chosen from one of a variety of different supervised machine learning algorithms. Exemplary supervised machine learning algorithms include: a decision tree, a bagging technique, a logistic regression, a perceptron, a support vector machine, or a relevance vector machine. It should be understood that the supervised machine learning algorithm can be any of those supervised machine learning algorithms or any other supervised machine learning algorithm that could be appropriate for this task.

Figure 9:
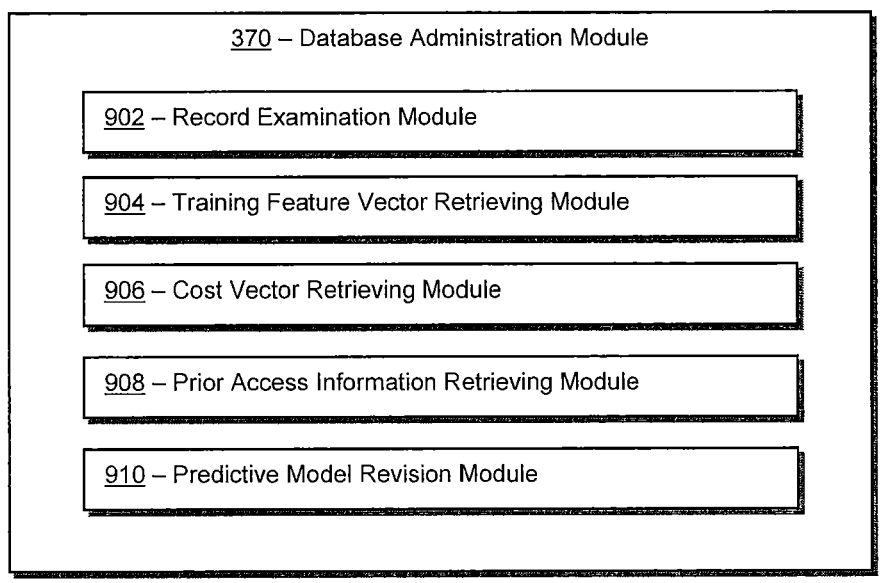
FIG. 9 illustrates a block diagram of a database administration module, according to an embodiment.

Turning ahead in the figures, FIG. 9 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include record examination module 902. In certain embodiments, record examination module 902 can perform block 802 (FIG. 8) of examining a record.

In some embodiments, database administration module 370 also can include a training feature vector retrieving module 904. In certain embodiments, training feature vector retrieving module 904 can perform block 804 (FIG. 8) of retrieving a training feature vector.

In various embodiments, database administration module 370 further can include a cost vector retrieving module 906. In certain embodiments, training feature vector retrieving module 906 can perform block 806 (FIG. 8) of retrieving a cost vector.

In various embodiments, database administration module 370 further can include a prior access information retrieving module 908. In certain embodiments, prior access information retrieving module 908 can perform block 808 (FIG. 8) of retrieving prior access information.

In various embodiments, database administration module 370 further can include a predictive model revision module 910. In certain embodiments, predictive model revision module 910 can perform block 910 (FIG. 8) of revising a predictive model.

Presented in an algorithmic form, the input to the training algorithm includes:

V: a list of feature vectors, one for each products in the database. Each vector is in the form of [feature_1, feature_2, . . . feature_n, label].

C=[Type-I error, Type-II error]: a cost vector specifying the costs of Type-I errors and Type-II errors.

L: A cost-insensitive machine learning algorithm.

The procedure of training the algorithm is:

1) use Meta-Cost to train a learner Meta_F from dataset V, with learning algorithm L, and cost vector C.

2) Return Meta_F as the learned model.

The inputs to the prediction algorithm includes:

V: A list of feature vectors without labels. Each vector represents one product and has the form of [feature_1, feature_2, feature_n].

F: P [0, 1]: A machine learning model that outputs the probability that a product (represented by its feature vector) will be accessed.

The procedure of using the algorithm to make predictions is as follows:

For each product's feature vector v in V: a) if F(v)>0.5, return 1 (that is, the product will be accessed); b) if F(v)<0.5, return 0 (that is, the product will not be accessed).

In some embodiments, there may be a separate database containing a "white-list" of items that are predetermined to be placed in a hot database cluster. In an electronic commerce situation, there may be certain items that a retailer desires to be placed in the hot database cluster regardless of predictions. The reasons for this can be varied. For example, some items can be part of a promotion. Because of the promotion, the retailer may desire that those items are always placed in the hot database cluster. In some embodiments, a large eCommerce provider may allow smaller eCommerce providers to sell products on the large eCommerce provider's site. In such a case, the large eCommerce provider may wish to use a white-list for certain providers. An example of such a situation is when a large eCommerce provider wishes to provide a white-list service for an additional fee. There can be a variety of other reasons why an eCommerce provider would prioritize items through the use of a white-list.

Figure 10:
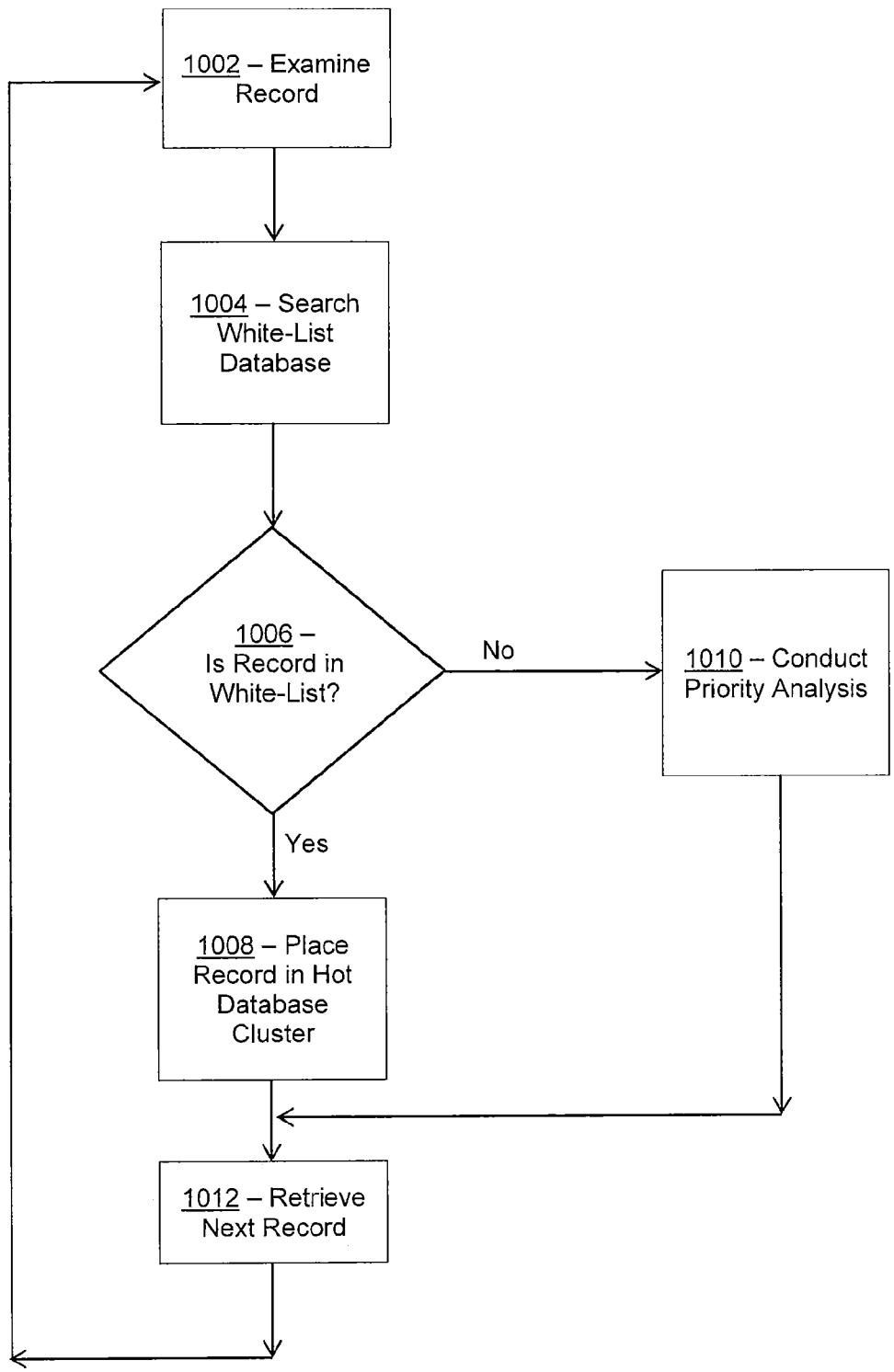
FIG. 10 illustrates a flowchart for an exemplary method of using a white-list database to group records into a first database cluster and a second database cluster.

Turning ahead in the drawings, FIG. 10 is a flowchart illustrating a method 1000 of using a white-list database to group records into a first database cluster and a second database cluster. Method 1000 is merely exemplary and is not limited to the embodiments presented herein. Method 1000 can be employed in many different embodiments or examples not specifically depicted or described herein. In some embodiments, the procedures, the processes and/or the activities of method 1000 can be performed in the order presented. In other embodiments, the procedures, the processes, and/or the activities of method 1000 can be performed in any other suitable order. In still other embodiments, one or more of the procedures, the processes, and/or the activities of method 1000 can be combined or skipped. In some embodiments, method 1000 can be implemented by online retail system 300 (FIG. 3).

Each such record in the set of records can be placed in one of the first database cluster H or the second database cluster L based on a likelihood of each such record being accessed. As above, a hot database server can host the hot database cluster and a cold database server can host the cold database cluster. The hot database server can have a greater processing capability than the cold database server.

Each record in the group of records is examined individually (block 1002). In an eCommerce situation, each record in a database can contain information regarding a single stock keeping unit (SKU). Thus, an item may have multiple records, one for each color, or for other items. For example, a video game title may have a separate SKU for each video game system; a cereal may have a separate record for each box size; furniture may have a separate SKU for each color, and the like. A white-list database is accessed to compare with the record being examined (block 1004). The white-list database can be created beforehand. Decision block 1006 determines the actions based on whether or not the record is contained in the white-list database. If the record being examined is in the white-list database, the record is placed in the hot database cluster (block 1008). If the record being examined is not in the white-list database, a separate priority analysis may be performed (block 1010). For example, the method of FIG. 5 or FIG. 7 can be performed on the record to determine the priority. Or another method can be performed that uses a predictive model to determine whether a record should be placed in the hot database cluster or the cold database cluster. Thereafter, the next record in the database can be retrieved (block 1012).

Figure 18:
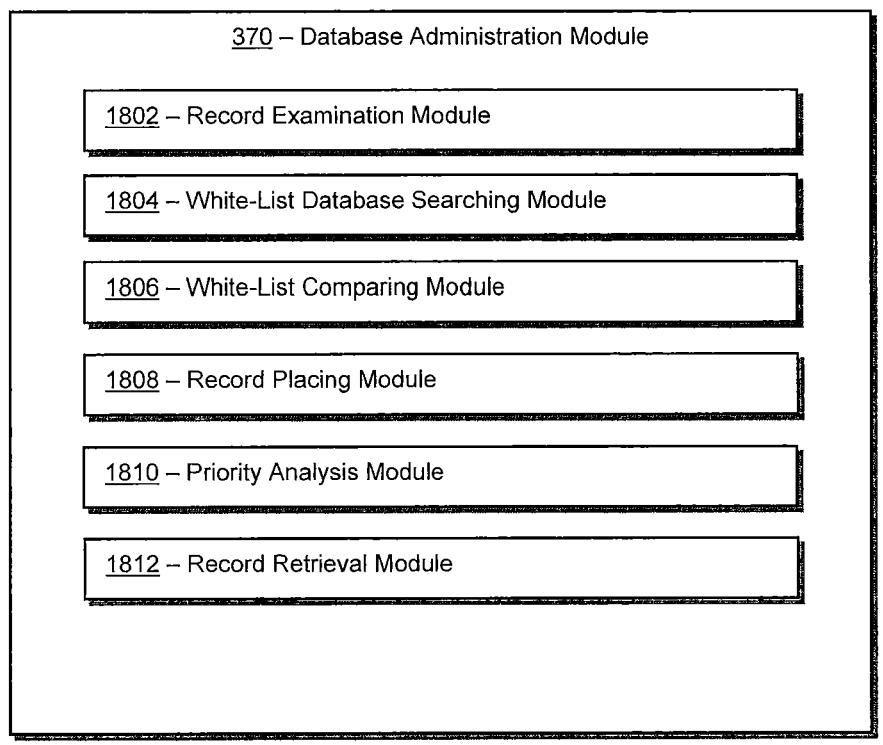
FIG. 18 illustrates a block diagram of a database administration module, according to an embodiment.

Turning ahead in the figures, FIG. 18 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include record examination module 1802. In certain embodiments, record examination module 1802 can perform block 1002 (FIG. 10) of examining a record.

In some embodiments, database administration module 370 also can include a white-list database searching module 1804. In certain embodiments, white-list database searching module 1804 can perform block 1004 (FIG. 10) of searching a white-list database.

In various embodiments, database administration module 370 further can include a white-list comparing module 1806. In certain embodiments, white-list comparing module 1806 can perform decision block 1006 (FIG. 10) of determining if a record is in the white-list database.

In various embodiments, database administration module 370 further can include a record placing module 1808. In certain embodiments, prior access record placing module 1808 can perform block 1008 (FIG. 10) of placing the record in the hot database cluster.

In various embodiments, database administration module 370 further can include a priority analysis module 1810. In certain embodiments, priority analysis module 1810 can perform block 1010 (FIG. 10) of performing a separate priority analysis.

In various embodiments, database administration module 370 further can include a record retrieval module 1812. In certain embodiments, record retrieval module 1812 can perform block 1012 (FIG. 10) of retrieving the next record.

As discussed above, a predictive model may be used to make predictions as to whether a particular record is likely to be accessed. One of the inputs to the predictive model can be the fact that a record was previously placed in the hot database cluster. It can be desirable to have the white-list status of a product not affect the predictive model. In other words, the fact that a record was placed in the hot database cluster due to the white-list may adversely affect future operation of the predictive model. In particular, a record may be part of the white-list and thus placed in the hot database cluster, but would have been predicted to be placed in the cold database cluster were it not being placed in the white-list. The machine learning algorithm would thus be learning "wrong" criteria for placing a record in the hot database cluster or the cold database cluster if it analyzed a white-list record and used its feature vector to determine whether or not records belonged in the hot database cluster or the cold database cluster.

In some embodiments, a method of preventing such an occurrence can involve the use of a special flag in each record. The flag, which can be called "ml_candidate" or any other suitable name, would indicate whether the record was placed in the hot database cluster due to a white-list database. In such a case, the predictive model can skip the record. In such a manner, the predictive model does not learn from a white-listed record.

In some embodiments, the date a record was placed in the white-list database can also be recorded. This date can be manually entered as a start date for the record to be in the white-list. For example, a promotion may start at a certain date, such as a football-related item being placed on the white-list in time for the football season. In another embodiment, the date can be automatically generated at the time of entry.

In some embodiments, there can also be an expiration date recorded in the white-list database. For example, a promotion may end on a certain date, such as a football-related item being removed from the white-list when the football season ends. When the expiration date occurs, the record can be removed from the white-list database or otherwise ignored. In some embodiments, the expiration date can be manually entered into the database system. In some embodiments, the expiration date can be calculated from the start date. For example, a record can have a default period of one-month to remain on the white-list database. The automated expiration date can be combined with the manual expiration date such that an item follows the automated expiration date unless the manual expiration date is filled.

One problem that could occur with a predictive model such as that presented above is that a record may be placed in the cold database cluster due to its feature vectors. Because the record is placed in the cold database cluster, the record is not returned as a result of a search. For example, with reference to FIG. 4 and the accompanying description, if there are sufficient results from a search of the hot database cluster alone, the cold database cluster might never be accessed. Because the predictive model can include whether or not the record was in the hot database cluster or the cold database cluster, the machine learning algorithm may never find that a specific record was worthy of being placed in the hot database cluster. In other words, the predictive model can use the fact that a record has never been accessed as a reason to place the record in the cold database cluster. But if a record is in the cold database cluster, the record is by definition less likely to be accessed because the cold database cluster is rarely accessed. This can become a self-fulfilling prophecy, as items placed in the cold-database cluster are never found, and are then placed in the cold database cluster again because it was never returned as a search result—but the reason the item was not returned as a search result is because the record was placed in the cold database cluster that was not searched. Thus, it can be desirable to place records in the hot database cluster even if other criteria would force the record into the cold database cluster.

Figure 11:
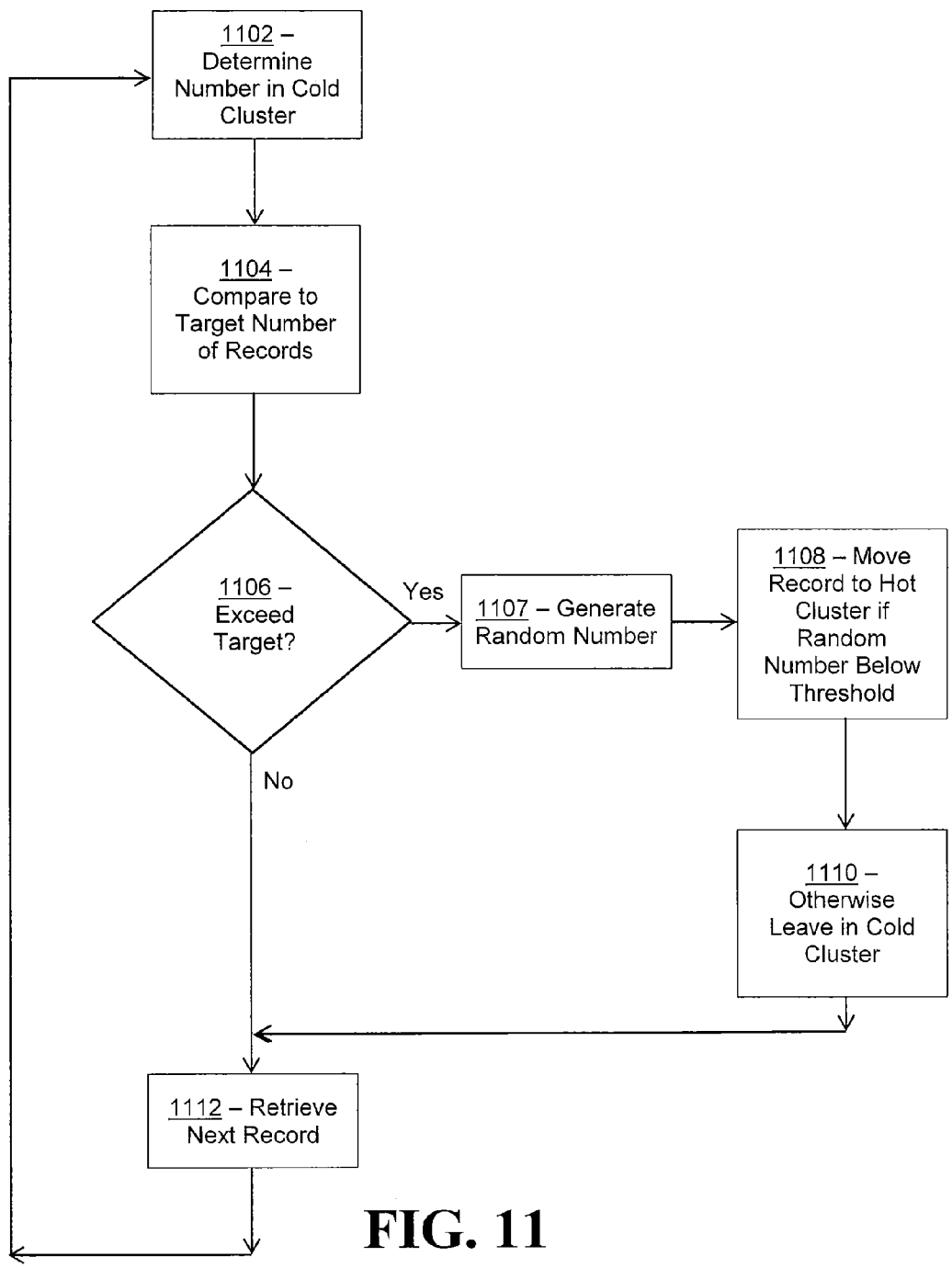
FIG. 11 illustrates a flowchart for an exemplary method of placing records into a hot database cluster using a random number generator.

Turning ahead in the drawings, FIG. 11 is a flowchart illustrating a method 1100 of placing certain records into a hot database cluster that would otherwise not be placed in the hot database cluster. Method 1100 is merely exemplary and is not limited to the embodiments presented herein. Method 1100 can be employed in many different embodiments or examples not specifically depicted or described herein. In some embodiments, the procedures, the processes and/or the activities of method 1100 can be performed in the order presented. In other embodiments, the procedures, the processes, and/or the activities of method 1100 can be performed in any other suitable order. In still other embodiments, one or more of the procedures, the processes, and/or the activities of method 1100 can be combined or skipped.

In some embodiments, method 1100 can be implemented by online retail system 300 (FIG. 3).

Each such record in the set of records can be placed in one of the first database cluster H or the second database cluster L based on a likelihood of each such record being accessed. As above, a hot database server can host the hot database cluster, and a cold database server can host the cold database cluster. The hot database server can have a greater processing capability than the cold database server. Using various algorithms such as those described above, records in the database system have been divided between the hot database cluster and the cold database cluster. The total number of records in the database system and the total number of records in the cold database cluster is determined (block 1102). There can be a variety of different manners in which to make this determination. For example, if a database uses SQL, an SQL command such as count( ) can be used to determine the number of records that are present in a specified database or table within a database. Because the database system comprises only the hot database cluster and the cold database cluster in this embodiment, the total number of records in the database system can be calculated by simply adding the total number of records in the hot database cluster and the cold database cluster.

The number of records in the cold database cluster can be compared to a target number of records (block 1104). The target number of records may be calculated in a variety of different manners. In one embodiment, previous experience may inform a database administrator of a target goal. For example, the target goal may be that 70 percent of records be in the cold database cluster and that 30 percent of the records be in the hot database cluster. However, another database administrator may find the optimum division to be 75 percent of records be in the cold database cluster and 25 percent of records in the hot database cluster.

In one embodiment, it is then determined if the number of records in the cold database cluster exceeds the target number of records in the cold database cluster (block 1106). It should be understood that, while the above description discusses a target number of records in the cold database cluster, it could also be the hot database cluster that has a target number of records.

In one embodiment, if the number of records in the cold database cluster exceeds the target number of records, then the following steps can be performed. For each record in the cold database cluster, a random number is generated (block 1107). The random number is then used to determine if the record should be moved to the hot database cluster. The random number can be generated in one of several different methods now known or developed in the future. The random number can be generated using a hardware generator. The random number can be generated using a software-based pseudo-random number generator.

In one embodiment, the random number is between 0 and 1. It should be understood that the random number may be generated between any two numbers. If the random number is below a certain predetermined value, the record is placed in the hot database cluster (step 1108). Otherwise, the record remains in the cold database cluster (step 1110). Thereafter, the method repeats blocks 1108 and 1110 with the next record (step 1112). Thereafter, upon receiving a search request from a requester, the search results can be presented to the requester. The search results can contain one or more records from the hot and cold database clusters, although in an embodiment, the search results contain one or more records only from the hot database cluster. It should be understood that, while the above example discusses an action taking place if a random number is below a certain value, certain embodiments may take an action if the random number is above a certain value.

The certain value that the random number is compared to can be generated in a variety of different manners. In an embodiment in which a record is moved from the cold database cluster to the hot database cluster when the random number is less than the certain predetermined value, the certain value may be calculated in the following manner. The target number of records in the cold database cluster can be subtracted from the total number of records in the cold database cluster. The result can then be divided by the total number of records in the cold database cluster.

For illustrative purposes, let us examine a hypothetical situation where there are 1000 total number of records in the database system. (It should be understood that this example is merely hypothetical. In a typical embodiment, there may be more or less than 1000 records in the database.) The target number of records in the cold database system may be 700 (i.e., 70% of the database is contained in the cold database cluster.) However, after various predictive models have been run, 771 records are in the cold database cluster. Placing these values in the above-presented formula:

$$\frac{771 - 700}{771}$$

The result is 71/771 or 0.0921. Thereafter, for each record, a random number is generated between 0 and 1. If the random number is less than 0.0921, then the record is moved to the hot database cluster. Otherwise, the record remains in the cold database cluster. This process would be executed for each record in the cold database cluster. With the random number, there is a 9.21% chance that the record will be moved from the cold database cluster to the hot database cluster. Once every record in the cold database cluster has been analyzed, there will be, on average, 71 records that are moved from the cold database cluster to the hot database cluster, thereby satisfying the original goal of 700 records in the cold database cluster and 300 records in the hot database cluster. The end result, on average, is that 71 more records are placed in the hot database cluster than would otherwise have been so placed. Thus, each record in the database has an opportunity to be placed in the hot database cluster, even if the record would normally be placed in the cold database cluster.

It should be noted that the methods provided with respect to FIGS. 10 and 11 can be independent of the methods used to divide records between a hot database cluster and a cold database cluster. In some embodiments, the methods provided with respect to FIGS. 10 and 11 operate regardless of how records were divided between a hot database cluster and a cold database cluster.

In some embodiments, the methods presented in FIGS. 10 and 11 can be combined. For example, with respect to FIG. 10, after block 1010, a record is analyzed to determine if the record should be placed in the hot database cluster or the cold database cluster. If the record has been selected to be placed in the cold database cluster, method 1100 of FIG. 11 can be executed. Thus, even after a predictive model determines that a record should be placed in the cold database cluster, the record still has a random chance of being placed in the hot database cluster.

Presented in algorithmic form, the input to an embodiment is as follows:

W: A white-list containing products that are to be marked as "hot"

P and V: The set of all products and feature vectors without labels, respectively.

F: P {0, 1}: The prediction algorithm that predicts either "hot" or "cold"

c: The desired ratio of "cold" products to all products.

The procedure of using the algorithm to make predictions is as follows:

1. For each product p in P:

A) If p is in W, mark p as "hot"

B) Otherwise, let v be the feature vector of p

If F(v)=1, mark p as hot, otherwise, mark p as cold.

2. Let W be the total number of white-listed products and P be the number of all products. Further, let $P_{hot}$ and $P_{cold}$ be the number of products marked as "hot" and "cold" by procedure 1(b) respectively. Thus, $P_{hot}+P_{cold}=P$.

3. If $P_{cold}>c*P$: for each product p in P: if p is marked "hot" then do nothing. Otherwise, re-mark p from "cold" to "hot" with the following probability:

$$\frac{P_{cold}-(c*P)}{P_{cold}}$$

Figure 12:
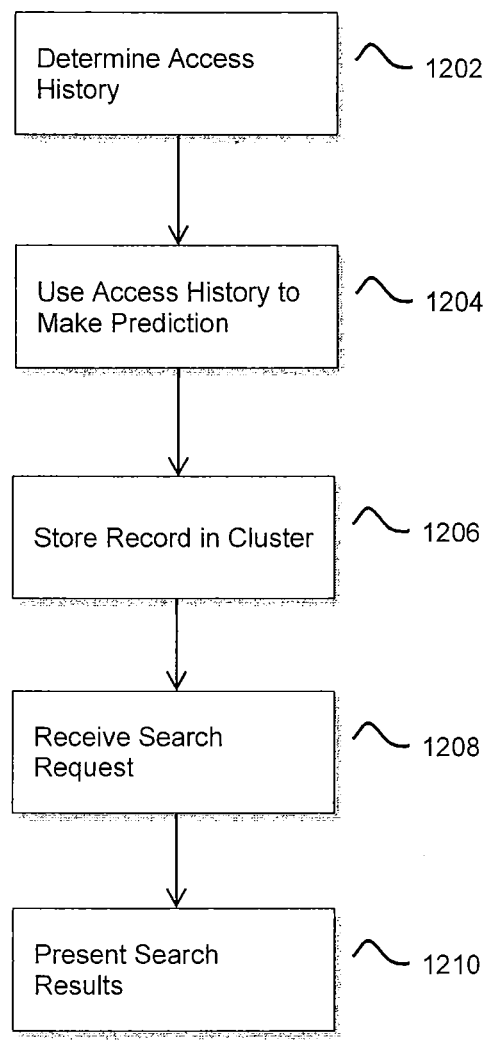
FIG. 12 illustrates a flowchart for an exemplary method of using seasonality to aid in the placing of records into either a hot database cluster or a cold database cluster.

Turning ahead in the drawings, FIG. 12 is a flowchart illustrating a method 1200 for using seasonality to aid in the placing of records into either a hot database cluster or a cold database cluster. Method 1200 is merely exemplary and is not limited to the embodiments presented herein. Method 1200 can be employed in many different embodiments or examples not specifically depicted or described herein. In some embodiments, the procedures, the processes and/or the activities of method 1200 can be performed in the order presented. In other embodiments, the procedures, the processes, and/or the activities of method 1200 can be performed in any other suitable order. In still other embodiments, one or more of the procedures, the processes, and/or the activities of method 1200 can be combined or skipped. In some embodiments, method 1200 can be implemented by online retail system 300 (FIG. 3).

As above, there is a database system that includes both a first database cluster H and a second database cluster L. These may be a hot database cluster and a cold database cluster. In some embodiments, the hot database cluster can be stored on a hot database server that has greater processing capabilities than the cold database server that stores the cold database cluster. A benefit of this type of arrangement is that results of the more important search terms can be placed on the hot database cluster such that searches are performed more quickly than searches of the cold database cluster. As discussed above, in certain embodiments, the hot database cluster and the cold database cluster can be arranged such that 99% of search requests require a search of only the hot database cluster.

In some embodiments, block 1202 represents determining an access history for a record in a set of distinct records in a database system. The access history can be used in a predictive model to predict a future likelihood of the record being accessed (block 1204). The access history for the record can be analyzed at one or more discrete time periods, the discrete time periods including an immediately prior year. In other words, the access history can be the access history from one year prior.

As discussed above, some items in an eCommerce system may have seasonal interest. In other words, items may be popular at only certain discrete time periods. As discussed above, a product's search history has at least some impact on the placing of the product in either the hot database cluster or the cold database cluster. So if a record representing a product has been consistently in the cold cluster for months at a time, a predictive model can have the tendency to place that product in the cold database cluster the next day. However, it the product has a seasonal pattern of popularity, it can be more desirable to place the product in the hot database in anticipation of increased interest in the product. Thus, one would be using the seasonal pattern for popularity to predict the future likelihood of the record being accessed. There are many examples of such items. For instance, there might be very few searches of Halloween costumes or decorations from late November of one year all the way through August of the next year. However, starting sometime around September, interest in Halloween costumes and decorations starts to increase. Similar search patterns may exist for other products that are associated with holidays such as New Year's Day, Valentine's Day, Thanksgiving, and Christmas. As discussed above, items such as sporting goods or tax-related items also may see seasonal search patterns. Using search data from the previous year takes this seasonal interest into account. An embodiment, using such a search, does not need to segregate holiday products from other products, because the search patterns from the prior year automatically takes care of that process.

Thereafter, the record can be stored in either the hot database cluster or the cold database cluster based at least on the future likelihood of the record being accessed (block 1206). After a search request is received from a requester (block 1208), the search results can be presented to the requester (block 1210).

Other discrete time periods may be used. For example, discrete time periods may be 1-day, 3-days, 7-days, 1-month, 3-months, 6-months, or one year. The method described in FIG. 12 may be performed with one or more of these discrete time periods. Other discrete time periods can also be used, the method is not limited to the time periods described above.

Figure 19:
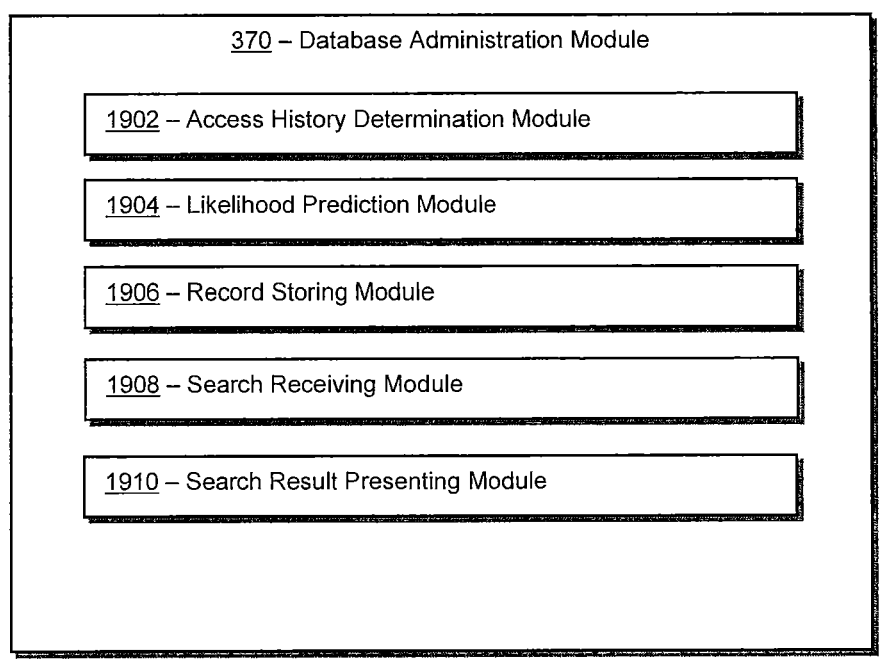
FIG. 19 illustrates a block diagram of a database administration module, according to an embodiment.

Turning ahead in the figures, FIG. 19 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include access history determination module 1902. In certain embodiments, access history determination module 1902 can perform block 1202 (FIG. 12) of determining an access history for a record.

In some embodiments, database administration module 370 also can include a likelihood prediction module 1904. In certain embodiments, likelihood prediction module 1904 can perform block 1204 (FIG. 12) of predicting a future likelihood.

In various embodiments, database administration module 370 further can include a record storing module 1906. In certain embodiments, record storing module 1906 can perform block 1206 (FIG. 12) of storing a record in the correct database cluster.

In various embodiments, database administration module 370 further can include a search receiving module 1908. In certain embodiments, search receiving module 1908 can perform block 1208 (FIG. 12) of receiving a search request.

In various embodiments, database administration module 370 further can include a search result presenting module 1910. In certain embodiments, search result presenting module 1910 can perform block 1210 (FIG. 12) of presenting search results to the requester.

Figure 13:
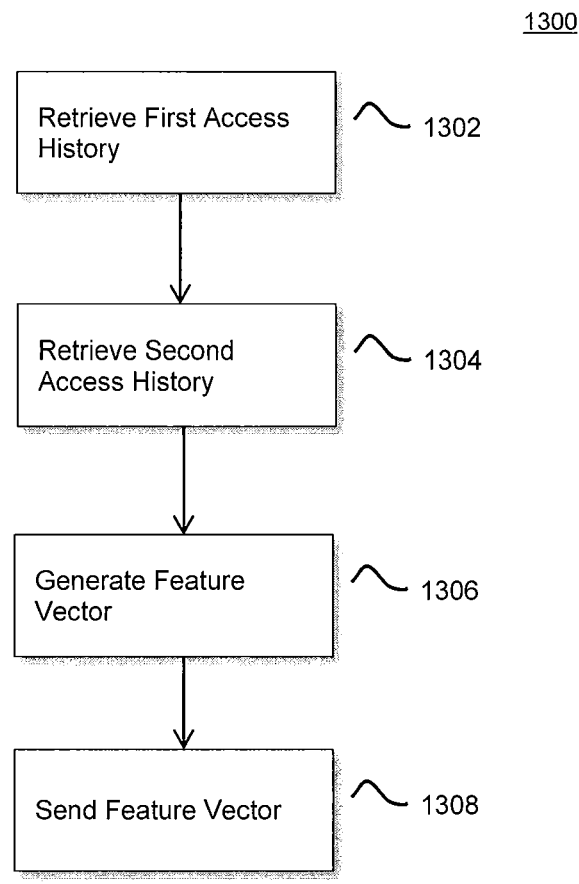
FIG. 13 illustrates a flowchart for a method for using seasonality to aid in the production of a feature vector.

Turning ahead in the drawings, FIG. 13 is a flowchart illustrating a method for using seasonality to aid in the production of a feature vector. Method 1300 is merely exemplary and is not limited to the embodiments presented herein. Method 1300 can be employed in many different embodiments or examples not specifically depicted or described herein. In some embodiments, the procedures, the processes and/or the activities of method 1300 can be performed in the order presented. In other embodiments, the procedures, the processes, and/or the activities of method 1300 can be performed in any other suitable order. In still other embodiments, one or more of the procedures, the processes, and/or the activities of method 1300 can be combined or skipped. In some embodiments, method 1300 can be implemented by online retail system 300 (FIG. 3).

The feature vector can be used to aid in the placing of records into either a hot database cluster or a cold database cluster. In one embodiment, a first access history for the record at a first time period is retrieved (block 1302). The access history can indicate a number of times the record was accessed within a single day that is a first time period away from a current day. Thereafter, one or more second access histories for the record can be retrieved (block 1304). The one or more second access histories can be for one or more additional time periods. Each second access history can be configured to indicate a number of times that the record was accessed within a single day that is a different predetermined time period away from the current day. The time periods can be selected from a variety of different time periods. Exemplary time periods can include 1-day, 3-days, 7-days, 1-month, 3-months, 6-months, or one year prior to the date the method is executed. Thereafter, the feature vector can be generated based on the first access history and the one or more second access histories of the record (block 1306). After being generated, the feature vector can be sent to the requesting party (block 1308).

In some embodiments, the steps of FIG. 7 may be performed. As a part of FIG. 7, a feature vector can be generated using the steps shown in FIG. 13. Thereafter, the steps of FIG. 7 could be performed using the feature vector generated in FIG. 13.

Figure 20:
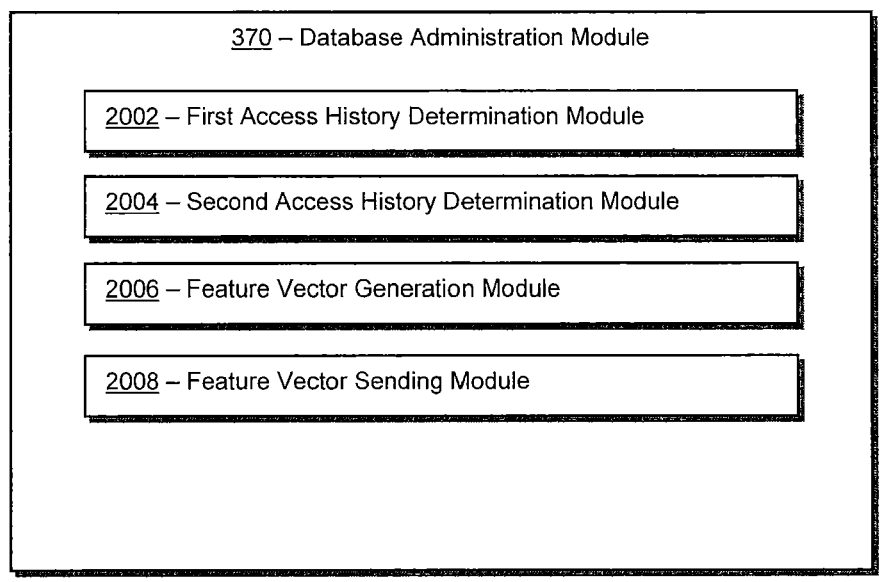
FIG. 20 illustrates a block diagram of a database administration module, according to an embodiment.

Turning ahead in the figures, FIG. 20 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include first access history determination module 2002. In certain embodiments, access history determination module 2002 can perform block 1302 (FIG. 13) of determining a first access history for a record.

In a number of embodiments, database administration module 370 can include second access history determination module 2004. In certain embodiments, access history determination module 2004 can perform block 1304 (FIG. 13) of determining a second access history for a record.

In various embodiments, database administration module 370 further can include a feature vector generation module 2006. In certain embodiments, feature vector generation module 2006 can perform block 1306 (FIG. 13) of generating a feature vector.

In various embodiments, database administration module 370 further can include a feature vector sending module 2008. In certain embodiments, feature vector sending module 2008 can perform block 1308 (FIG. 13) of sending a feature vector to a requesting party.

Figure 14:
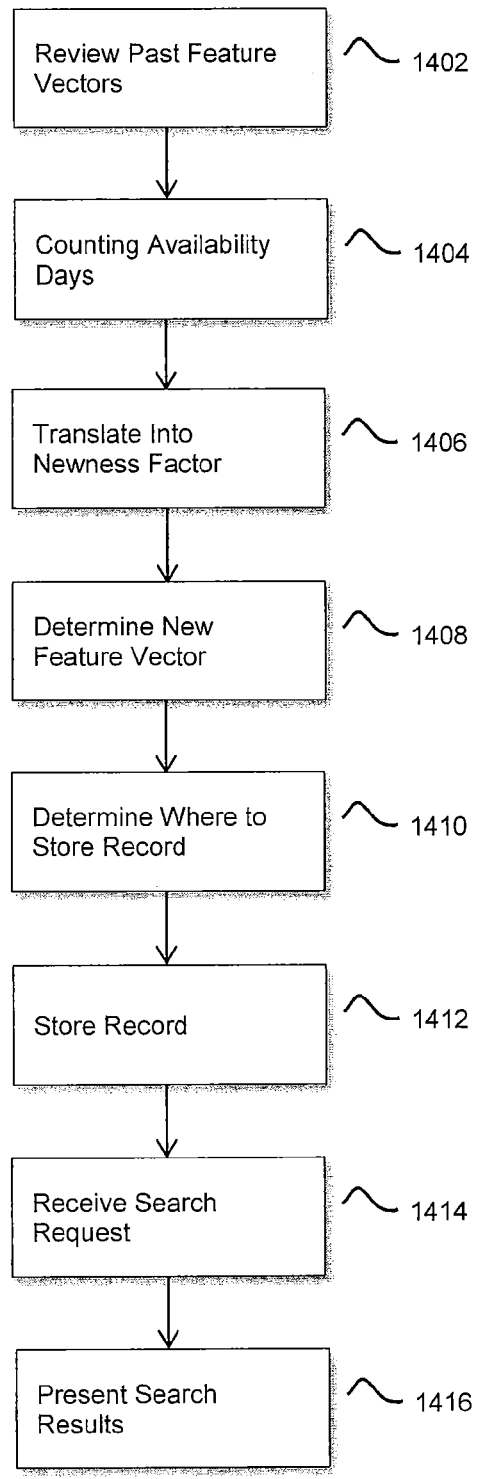
FIG. 14 illustrates a flowchart for an exemplary method for using newness to aid in the placing of records into either a hot database cluster or a cold database cluster.

Turning ahead in the drawings, FIG. 14 is a flowchart illustrating a method 1400 for using newness to aid in the placing of records into either a hot database cluster or a cold database cluster. Method 1400 is merely exemplary and is not limited to the embodiments presented herein. Method 1400 can be employed in many different embodiments or examples not specifically depicted or described herein. In some embodiments, the procedures, the processes and/or the activities of method 1400 can be performed in the order presented. In other embodiments, the procedures, the processes, and/or the activities of method 1400 can be performed in any other suitable order. In still other embodiments, one or more of the procedures, the processes, and/or the activities of method 1400 can be combined or skipped. In some embodiments, method 1400 can be implemented by online retail system 300 (FIG. 3).

As above, there may be a set of distinct records in a database system. The database system comprising a first database cluster H (a hot database cluster) and a second database cluster L (a cold database cluster). Each such record in the set of records is placed in one of the first database cluster H or the second database cluster L based on a likelihood of each such record being accessed. As above, a hot database server can host the hot database cluster, and a cold database server can host the cold database cluster. The hot database server can have a greater processing capability than the cold database server. At block 1402, a set of past feature vectors for the record can be reviewed. There may be different aspects of reviewing the past feature vectors. In one embodiment, an aspect can include counting the number of days that the set of past feature vectors for the record indicated that the record was available (block 1404). Thereafter, the number of days the record was available can be translated into a newness factor (block 1406). The newness factor can then be used to help determine a new feature vector for the record (block 1408). Then the new feature vector to determine whether to store the record in the hot database cluster H or the cold database cluster L (block 1410). The record can be stored in the first database cluster H or the second database cluster L based at least in part on the new feature vector (block 1412). After receiving a search request from a requester (block 1414), an embodiment would then present a search result containing one or more records to the requester (1416).

The purpose of the newness factor in an eCommerce system would be to help to ensure that newer products get placed in the hot database cluster, to encourage the sale of the newer products. Having a field in the database record that records the first date of sale of the product may be one method of storing such data. However, a disadvantage of using such a field is that there can be multiple reasons that a product becomes "new." Clearly, when a product is first introduced, it is new. This situation occurs often for products such as movies and books, which have release dates, before which, the product is not available. There may be other situations when a product is unavailable. One common situation is when a product sells out. When the product gets back in stock, it can be desirable to have the product be placed in the hot database cluster to encourage sales of the product. The newness factor takes care of such a situation by being translated from the number of days the product was available within a certain time period. For example, an embodiment can look at past feature vectors from the past month and determine how many days the product was available within that month. Products with a low number of days available can have a low newness factor and thus be more likely to be placed in the hot database cluster.

The new feature vector can then be used in a predictive model. The predictive model can use the feature vector to assign or attribute records to either the hot database cluster or the cold database cluster.

In some embodiments, the steps of FIG. 7 can be performed. As part of FIG. 7, a feature vector can be generated using steps 1402, 1404, 1406, and 1408 shown in FIG. 14. Thereafter, the steps of FIG. 7 could be performed using the feature vector generated in FIG. 14.

Figure 21:
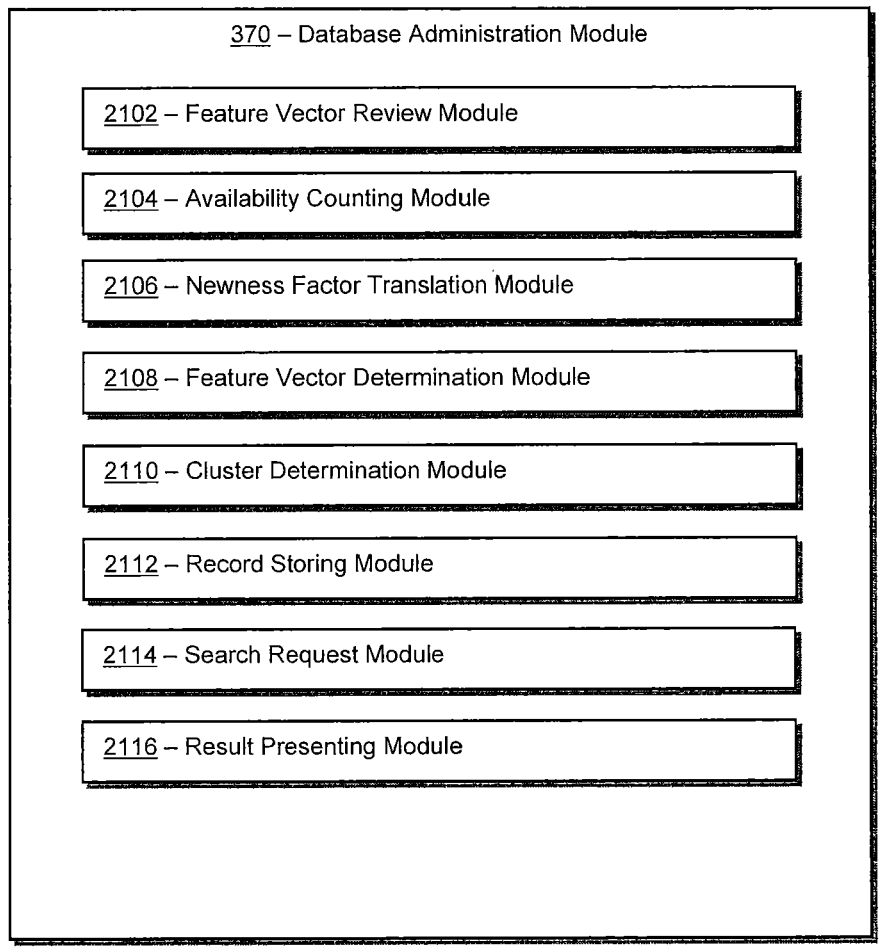
FIG. 21 illustrates a block diagram of a database administration module, according to an embodiment.

Turning ahead in the figures, FIG. 21 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include feature vector review module 2102. In certain embodiments, access history determination module 2102 can perform block 1402 (FIG. 14) of reviewing past feature vectors for a record.

In a number of embodiments, database administration module 370 can include availability counting module 2104. In certain embodiments, access history determination module 2104 can perform block 1404 (FIG. 14) of counting the number of days of availability of for a record.

In various embodiments, database administration module 370 further can include a newness factor translation module 2106. In certain embodiments, feature vector generation module 2106 can perform block 1406 (FIG. 14) of translating availability into a newness factor.

In various embodiments, database administration module 370 further can include a feature vector determination module 2108. In certain embodiments, feature vector determination module 2108 can perform block 1408 (FIG. 14) of determining a feature vector for the record.

In a number of embodiments, database administration module 370 can include cluster determination module 2110. In certain embodiments, cluster determination module 2110 can perform block 1410 (FIG. 14) of determining which cluster to store a record.

In a number of embodiments, database administration module 370 can include record storing module 2112. In certain embodiments, record storing module 2112 can perform block 1412 (FIG. 14) of storing a record in a database cluster.

In various embodiments, database administration module 370 further can include a search request module 2114. In certain embodiments, search request module 2114 can perform block 1414 (FIG. 14) of receiving a search request.

In various embodiments, database administration module 370 further can include a result presenting module 2116. In certain embodiments, result presenting module 2116 can perform block 1416 (FIG. 14) of presenting search results to a requesting party.

Figure 15:
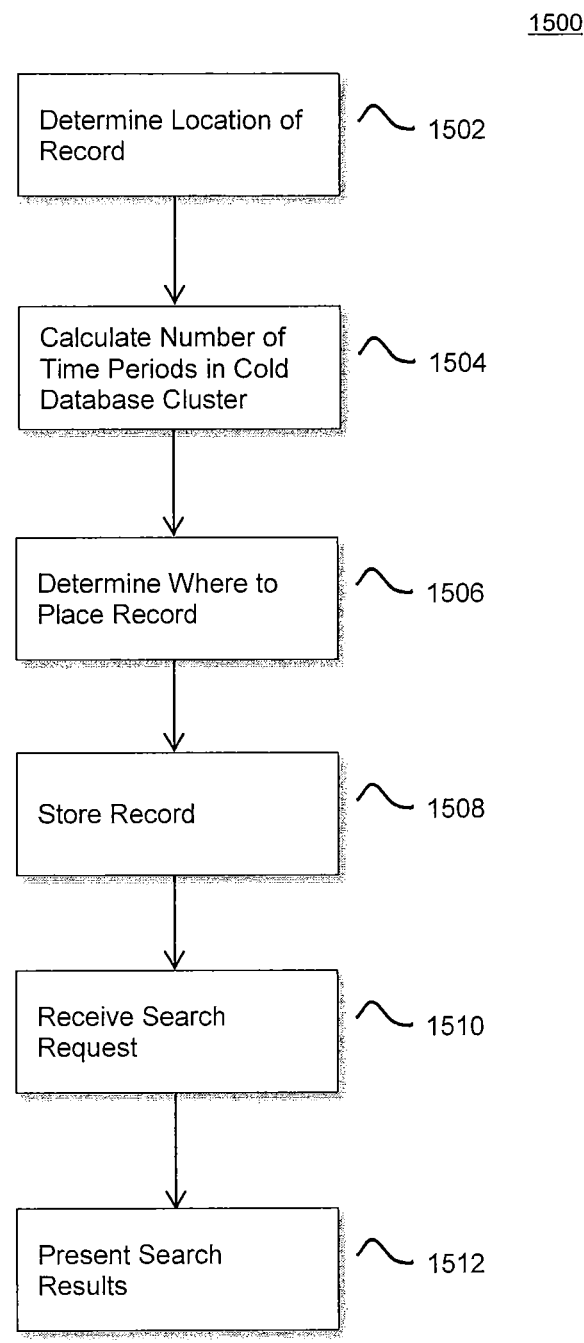
FIG. 15 illustrates a flowchart for using coldness to aid in the placing of records into either a hot database cluster or a cold database cluster.

Turning ahead in the drawings, FIG. 15 is a flowchart illustrating a method 1500 for using coldness to aid in the placing of records into either a hot database cluster or a cold database cluster. Method 1500 is merely exemplary and is not limited to the embodiments presented herein. Method 1500 can be employed in many different embodiments or examples not specifically depicted or described herein. In some embodiments, the procedures, the processes and/or the activities of method 1500 can be performed in the order presented. In other embodiments, the procedures, the processes, and/or the activities of method 1500 can be performed in any other suitable order. In still other embodiments, one or more of the procedures, the processes, and/or the activities of method 1500 can be combined or skipped. In some embodiments, method 1500 can be implemented by online retail system 300 (FIG. 3).

As above, there may be a set of distinct records in a database system. The database system comprising a first database cluster H (a hot database cluster) and a second database cluster L (a cold database cluster). Each such record in the set of records is placed in one of the first database cluster H or the second database cluster L based on a likelihood of each such record being accessed. As above, a hot database server can host the hot database cluster, and a cold database server can host the cold database cluster. The hot database server can have a greater processing capability than the cold database server. At block 1502, it is determined if a record was placed in the second database cluster L (i.e., the cold database cluster) for a smaller time period within a longer time period (also known as the location of the record). Thereafter, at block 1504, one would calculate a total number of the smaller time periods within the longer time period that the record was placed in the cold database cluster. In one embodiment, the smaller time period can be a day, and the longer time period can be a month. So this block would then be calculating the number of days within a month that the record was placed in the cold database cluster. At block 1506, the total number of the smaller time periods would be used to help determine if the record should be placed in the hot database cluster or the cold database cluster. At block 1508, the record can be stored in either the hot database cluster or the cold database cluster L based on the determination. After a search request is received from a requester (block 1510), the search results can be presented to the requester (block 1512).

In some embodiments, there can be a threshold value for the number of days (or other value used for the smaller time period) the record was placed in the cold database cluster. If the record was placed in the cold database cluster more than that threshold number, the record can be placed in the cold database cluster again.

In some embodiments, the total number of smaller time periods that the record was in the cold database cluster can be part of a feature vector that is used as an input into a predictive model.

Figure 22:
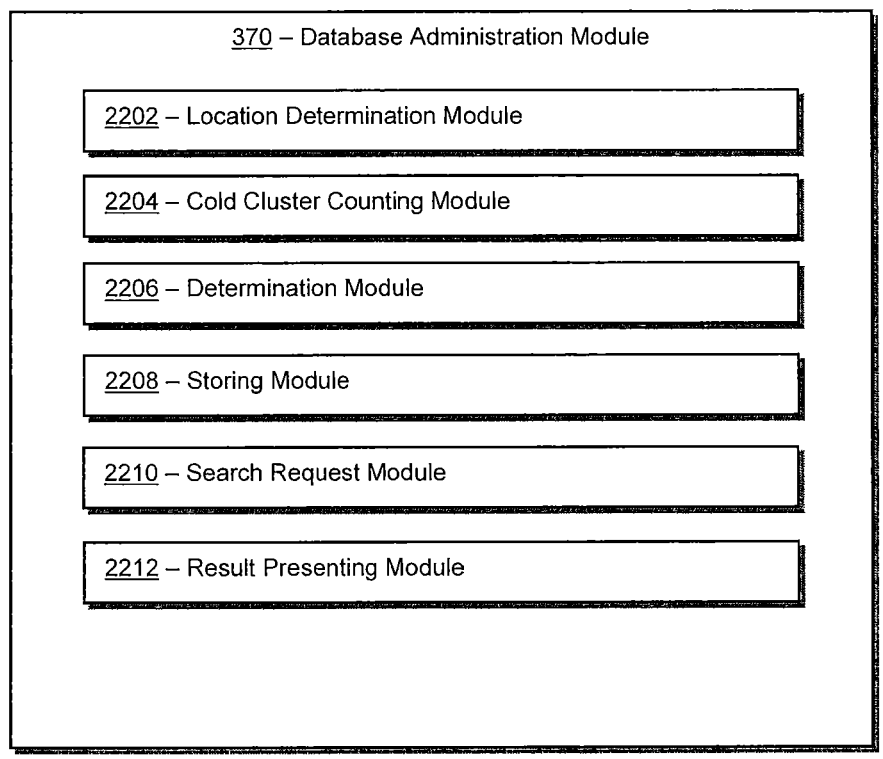
FIG. 22 illustrates a block diagram of a database administration module, according to an embodiment.

Turning ahead in the figures, FIG. 22 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include location determination module 2202. In certain embodiments, location determination module 2202 can perform block 1502 (FIG. 15) of determining the location of a record.

In a number of embodiments, database administration module 370 can include cold cluster counting module 2204. In certain embodiments, cold cluster counting module 2204 can perform block 1504 (FIG. 15) of calculating the number of smaller time periods within the longer time period that the record was placed in the cold database cluster.

In various embodiments, database administration module 370 further can include a determination module 2206. In certain embodiments, determination module 2206 can perform block 1506 (FIG. 15) of determining if the record should be placed in the hot database cluster or the cold database cluster.

In various embodiments, database administration module 370 further can include a storing module 2208. In certain embodiments, storing module 2208 can perform block 1508 (FIG. 15) of storing the record in either the hot database cluster or the cold database cluster.

In various embodiments, database administration module 370 further can include a search request module 2210. In certain embodiments, search request module 2210 can perform block 1510 (FIG. 15) of receiving a search request.

In various embodiments, database administration module 370 further can include a result presenting module 2212. In certain embodiments, result presenting module 2212 can perform block 1512 (FIG. 15) of presenting search results to a requesting party.

Figure 16:
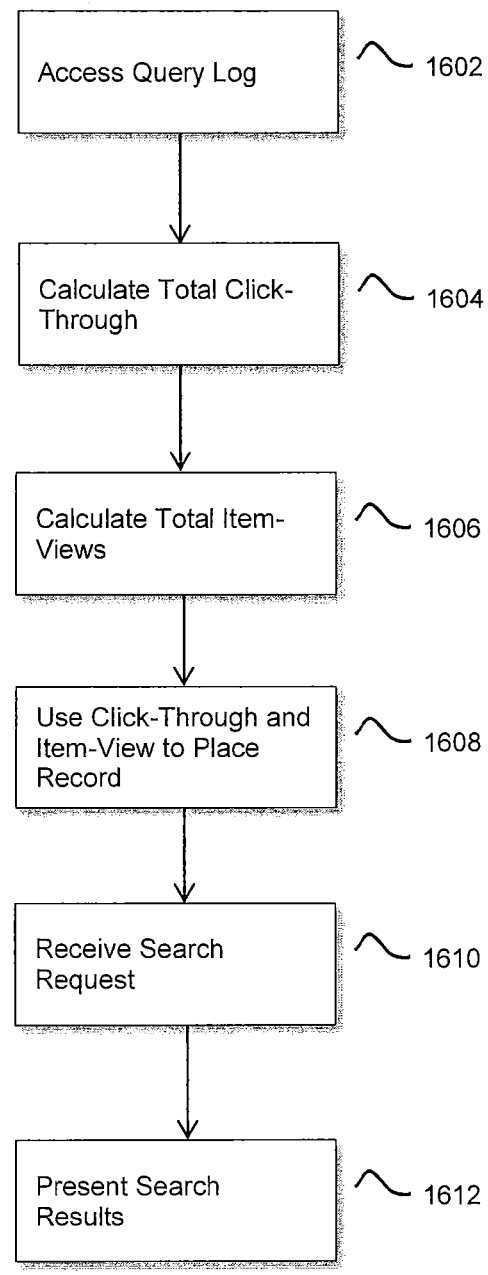
FIG. 16 illustrates a flowchart for using historical search information to aid in the placing of records into either a hot database cluster or a cold database cluster.

Turning ahead in the drawings, FIG. 16 is a flowchart illustrating a method 1600 for using historical search information to aid in the placing of records into either a hot database cluster or a cold database cluster. Method 1600 is merely exemplary and is not limited to the embodiments presented herein. Method 1600 can be employed in many different embodiments or examples not specifically depicted or described herein. In some embodiments, the procedures, the processes and/or the activities of method 1600 can be performed in the order presented. In other embodiments, the procedures, the processes, and/or the activities of method 1600 can be performed in any other suitable order. In still other embodiments, one or more of the procedures, the processes, and/or the activities of method 1600 can be combined or skipped. In some embodiments, method 1600 can be implemented by online retail system 300 (FIG. 3).

As above, there may be a set of distinct records in a database system. The database system comprising a first database cluster H (a hot database cluster) and a second database cluster L (a cold database cluster). Each such record in the set of records is placed in one of the first database cluster H or the second database cluster L based on a likelihood of each such record being accessed. As above, a hot database server can host the hot database cluster and a cold database server can host the cold database cluster. The hot database server can have a greater processing capability than the cold database server.

In a typical eCommerce system there is a search system. A user enters in a search term into the search system and a page is presented to the user that has search results. In some embodiments, the search result page has a number of search results, being ordered in some manner to the user.

In some embodiments, there can be a history of queries being run on the search engine. Such a history is typically contained on a query log. The query log can have information about what search terms were used for a search, what results were shown as a result of the search (also known as item-view information), in which order the results were shown, and what items were clicked on the search result page (also known as click-through information). For every record in the database system, a query log can be accessed (block 1602). The total click-through can be calculated by determining how many times the record was clicked by a user (block 1604). This calculation can be limited to a certain time period. In one embodiment, the time period of interest can be one month. In another embodiment, the time period of interest can be one week. Other time periods can be used. The time period can be determined in real time on a dynamic basis. In other embodiments, the time period can be predetermined. Whatever shorter or longer time period of interest is used, the total number of clicks in that time period can be calculated. The total item-view can be calculated in a similar manner, for the same time period (block 1606). For both the total item-view and the total click-through, the position on a search results page can also be noted. For example, if the record was shown as the first search result, there can be an entry in the query log so noting that fact. In another embodiment, calculating the total item-view and total click-through can be limited by the position of the record on a search results page. For example, the total item-view and total click-throughs can be calculated only for instances in which the record was the first item (or one of the top three items, one of the top five items, top ten items, etc.) on a search results page.

In some embodiments, there can be separate totals that are based on the position of the record on a search results page. For example, there can be a total item-view and total click-view for the record being the top search result. Then there can be a total item-view and total click-view for the record being one of the top two search results. Then there can be a total item-view and total click-view for the record being one of the top three search results. And so on for several different values of number of search results. In one embodiment, the value of the search result can be a power of two. Thus, there can be a total item-view and total click-view for top search result, top two search results, top four search results, top eight search results, top 16 search results, and so on. Similarly, the value of the search result can be chosen in any other manner, such as being a power of three, a power of four, a power of five, or a power of ten.

Thereafter, the total click-through and total item-view can be used to help determine if the record is to be placed in the hot database cluster or the cold database cluster (block 1608). This can comprise using the total click-through and total item-view in a predictive model. In such an example, total click-through and total item-view can be placed in a feature vector that is used by the predictive model when storing records in either the hot database cluster or the cold database cluster.

In such a manner, when a search request is received from a requester (block 1610), the results of the search (containing one or more records) can be presented to the requester (block 1612).

Figure 23:
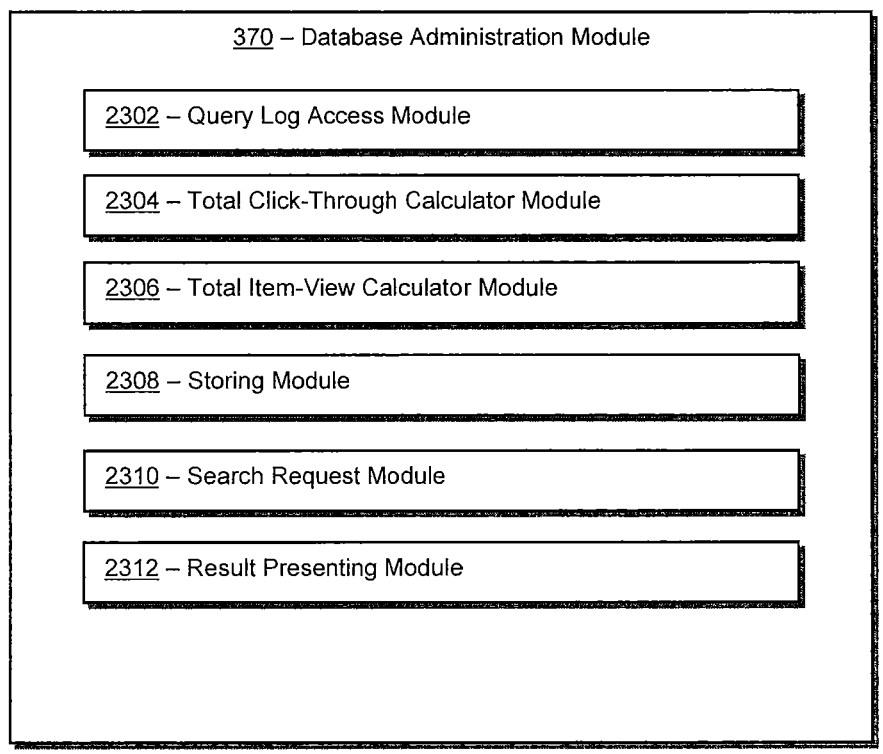
FIG. 23 illustrates a block diagram of a database administration module, according to an embodiment.

Turning ahead in the figures, FIG. 23 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include query log access module 2302. In certain embodiments, query log access module 2302 can perform block 1602 (FIG. 16) of accessing a query log.

In a number of embodiments, database administration module 370 can include total click-through calculator module 2304. In certain embodiments, total click-through calculator module 2304 can perform block 1604 (FIG. 15) of calculating the total click-through.

In various embodiments, database administration module 370 further can include a total-item view calculator module 2306. In certain embodiments, total-item view calculator module 2306 can perform block 1606 (FIG. 16) of calculating total item-view.

In various embodiments, database administration module 370 further can include a storing module 2308. In certain embodiments, storing module 2308 can perform block 1608 (FIG. 16) of storing the record in either the hot database cluster or the cold database cluster.

In various embodiments, database administration module 370 further can include a search request module 2310. In certain embodiments, search request module 2310 can perform block 1610 (FIG. 16) of receiving a search request.

In various embodiments, database administration module 370 further can include a result presenting module 2312. In certain embodiments, result presenting module 2312 can perform block 1612 (FIG. 16) of presenting search results to a requesting party.

Figure 17:
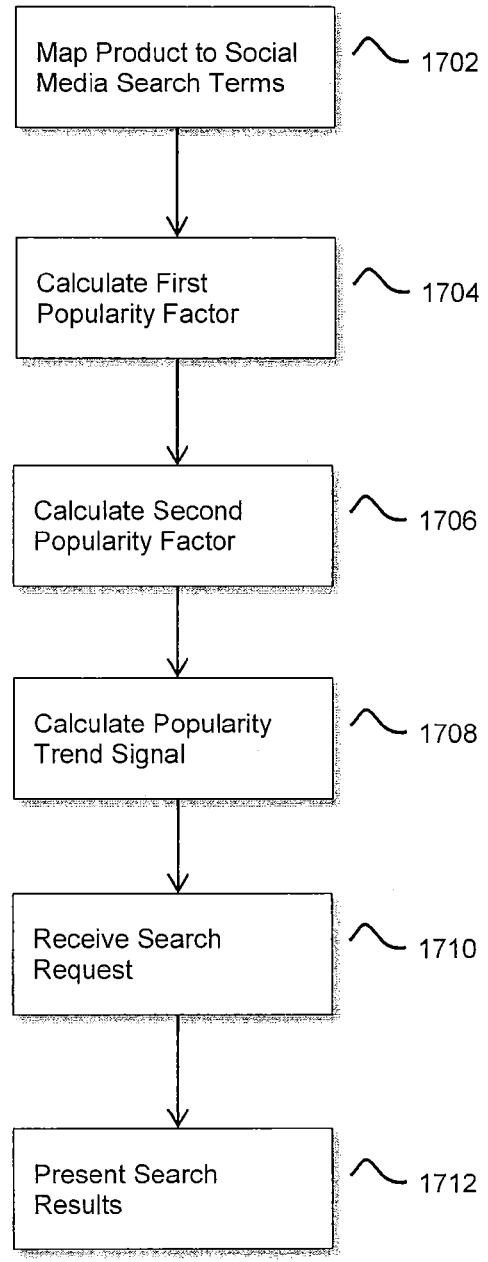
FIG. 17 illustrates a flowchart for using external information to aid in the placing of records into either a hot database cluster or a cold database cluster.

Turning ahead in the drawings, FIG. 17 is a flowchart illustrating a method 1700 for using external information to aid in the placing of records into either a hot database cluster or a cold database cluster. Method 1700 is merely exemplary and is not limited to the embodiments presented herein. Method 1700 can be employed in many different embodiments or examples not specifically depicted or described herein. In some embodiments, the procedures, the processes and/or the activities of method 1700 can be performed in the order presented. In other embodiments, the procedures, the processes, and/or the activities of method 1700 can be performed in any other suitable order. In still other embodiments, one or more of the procedures, the processes, and/or the activities of method 1700 can be combined or skipped. In some embodiments, method 1700 can be implemented by online retail system 300 (FIG. 3).

As above, there may be a set of distinct records in a database system. The database system comprising a first database cluster H (a hot database cluster) and a second database cluster L (a cold database cluster). Each such record in the set of records is placed in one of the first database cluster H or the second database cluster L based on a likelihood of each such record being accessed. As above, a hot database server can host the hot database cluster, and a cold database server can host the cold database cluster. The hot database server can have a greater processing capability than the cold database server.

Social media has become an important part of marketing products. Social media sites, including, but not limited to, Facebook, Twitter, Google Plus, Instagram, and Pinterest have a large number of users, many of whom use the social media sites regularly. Because of the large user base, it can be desirable for companies to use and track social media mentions of their products. Positive mentions can become important because "word of mouth" information from known people can be an important part of marketing.

In order to track mentions on a social media platform, there can be a mapping between a product and search terms on the social media platform (block 1702). It should be understood that tracking between a product and search terms can be ambiguous. For example, if someone mentions a brand of television in a social media post, to which model of the brand is the post referring. This tracking is done to the best of the ability of the tracker. A generic post regarding a brand of televisions can be counted for every model of television within that brand sold by an eCommerce website. A more specific mention can be narrowed down accordingly. To take another example, a generic mention of a video game can be credited to every edition of that video game sold by an eCommerce website. A more specific mention of the video game and the platform the game is being executed on can result in the credit going to a specific edition of that product.

The number of mentions on a social media site during a first time period can be tracked and considered a first popularity factor (block 1704). The number of mentions during a second time period can be tracked and considered a second popularity factor (block 1706). In an embodiment, the first time period and second time period can have the same length, but a different start date. For example, the first time period can be a week, counting backward from today, the second time period can be a week counting backward from a week ago. In other examples, shorter or longer time periods can be used. In still other embodiments, the first and second time periods can have different lengths and the same or different start dates. In an embodiment, it also can be possible for the time periods to overlap. For example, the first time period can be a week, counting backward from today, while the second time period can be a week, counting backward from two days ago. In some embodiments, the time period can be determined dynamically. In some embodiments, the time period can be predetermined.

In an embodiment, the first popularity factor can be compared with the second popularity factor to create a popularity trend signal (block 1708). Analyzing the trend as opposed to the raw data allows popularity to be tracked across multiple social media sites. For example, at the current time, Facebook has more users than Pinterest, so comparing mentions on Facebook to mentions on Pinterest could be difficult. However, comparing social media trends across different social media sites can be possible. A popularity trend signal can be an indication that social media mentions are increasing or decreasing and by how much the mentions are increasing or decreasing. Thus, it can be desirable to repeat blocks 1702 through 1708 for multiple social media sites. Thereafter, a popularity trend signal from one social media site can be aggregated with a popularity trend signal from another social media site to create an aggregate popularity trend signal. The popularity trend signal (aggregated or not) can then be used to help store the record in either the hot database cluster or the cold database cluster. This technique can comprise using the popularity trend signal in a predictive model. In such an example, the popularity trend signal can be placed in a feature vector that is used by the predictive model when storing records in either the hot database cluster or the cold database cluster.

In such a manner, when a search request is received from a requester (block 1710), the results of the search (containing one or more records) can be presented to the requester (block 1712).

Figure 24:
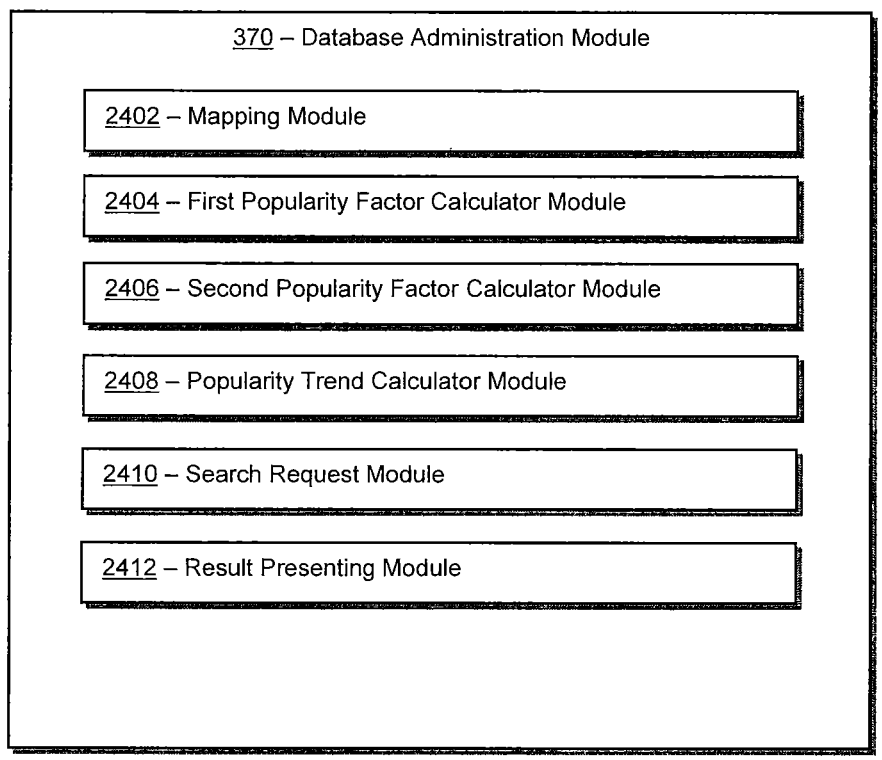
FIG. 24 illustrates a block diagram of a database administration module, according to an embodiment.

Turning ahead in the figures, FIG. 24 illustrates a block diagram of database administration module 370 (FIG. 3). Database administration module 370 is merely exemplary and is not limited to the embodiments presented herein. Database administration module 370 can be employed in many different embodiments or examples not specifically depicted or described herein. In some embodiments, certain elements or modules of database administration module 370 can perform various procedures, processes, and/or acts. In other embodiments, the procedures, processes, and/or acts can be performed by other suitable elements or modules.

In a number of embodiments, database administration module 370 can include mapping module 2402. In certain embodiments, mapping module 2402 can perform block 1702 (FIG. 17) of mapping a product to social media search terms.

In a number of embodiments, database administration module 370 can include first popularity factor calculator module 2404. In certain embodiments, first popularity factor calculator module 2404 can perform block 1704 (FIG. 17) of calculating the first popularity factor.

In a number of embodiments, database administration module 370 can include second popularity factor calculator module 2406. In certain embodiments, second popularity factor calculator module 2406 can perform block 1706 (FIG. 17) of calculating the second popularity factor.

In various embodiments, database administration module 370 further can include a popularity trend calculator module 2408. In certain embodiments, popularity trend calculator module 2408 can perform block 1708 (FIG. 17) of calculating a popularity trend signal.

In various embodiments, database administration module 370 further can include a search request module 2410. In certain embodiments, search request module 2410 can perform block 1710 (FIG. 17) of receiving a search request.

In various embodiments, database administration module 370 further can include a result presenting module 2412. In certain embodiments, result presenting module 2412 can perform block 1712 (FIG. 17) of presenting search results to a requesting party.

Although the above embodiments have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-24 may be modified, and that the foregoing discussion of certain of these embodiments does not necessarily represent a complete description of all possible embodiments. For example, one or more of the procedures, processes, or activities of FIGS. 1-24 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method being implemented via execution of computing instructions configured to run at one or more processors and configured to be stored at non-transitory computer-readable media, the method comprising:

storing a set of distinct records in a database system;

accessing a query log which comprises click-through information and item-view information for the set of distinct records, wherein (1) the click-through information comprises information about every record in the set of distinct records on which any user ever clicked, and (2) the item-view information comprises information about every record in the set of distinct records shown to any user as a result of a query;

calculating a total click-through for a record in the set of distinct records by determining how many times the record was clicked during a time period as recorded in the click-through information in the query log;

calculating a total item-view for the record by determining how many times the record received an item-view during the time period as recorded in the item-view information in the query log;

placing the record in either a first database cluster H in the database system or a second database cluster L in the database system based on the total click-through for the record and the total item-view for the record, wherein if the record is stored in the first database cluster H based on the total click-through for the record and the total item-view for the record, then the record has a higher likelihood of being accessed than if the record is stored in the second database cluster L based on the total click-through for the record and the total item-view for the record;

receiving a search request from a requester; and presenting a search result containing one or more records in the set of distinct records to the requester;

wherein:

if the record was located at a predetermined ranking or higher on the first results list, calculating the total click-through further comprises, for each time the record was clicked by any user during the time period, determining a first position of the record on a first results list on which the record was located when the record was clicked;

if the record was located at the predetermined ranking or higher on the second results list, calculating the total item-view further comprises, for each time the record was clicked by any user during the time period, determining a second position of the record on a second results list on which the record was located when the record was displayed;
the predetermined ranking is a power of 2 or greater;
the first database cluster H is stored on a first database server;
the second database cluster L is stored on a second database server;
the first database server has greater processing capabilities than the second database server;
the method further comprises:
   entering the total click-through for the record and the total item-view for the record in a feature vector that is used by a predictive model to determine a predicted likelihood of the record being accessed; and
   determining the time period in real time on a dynamic basis; and
storing the record in either the first database cluster H or the second database cluster L based on the total click-through for the record and the total item-view for the record comprises storing the record in either the first database cluster H or the second database cluster L based on the predicted likelihood of the record being accessed.

2. A system comprising:
one or more processors; and
one or more non-transitory memory media storing computing instructions configured to run on the one or processors and perform acts of:
   storing a set of distinct records in a database system;
   accessing a query log which comprises click-through information and item-view information the set of distinct records, wherein (1) the click-through information comprises information about every record in the set of distinct records on which any user ever clicked, and (2) the item-view information comprises information about every record in the set of distinct records shown to any user as a result of a query;
   calculating a total click-through for a record in the set of distinct records by determining how many times the record was clicked during a time period as recorded in the click-through information in the query log;
   calculating a total item-view for the record by determining how many times the record received an item-view during the time period as recorded in the item-view information in the query log;
   placing the record in either a first database cluster H in the database system or a second database cluster L in the database system based on the total click-through for the record and the total item-view for the record, wherein if the record is stored in the first database cluster H based on the total click-through for the record and the total item-view for the record, then the record has a higher likelihood of being accessed than if the record is stored in the second database cluster L based on the total click-through for the record and the total item-view for the record;
   receiving a search request from a requester; and
   presenting a search result containing one or more records in the set of distinct records to the requester;
wherein:
   if the record was located at a predetermined ranking or higher on the first results list, calculating the total click-through further comprises, for each time the record was clicked by any user during the time period, determining a first position of the record on a first results list on which the record was located when the record was clicked;
   if the record was located at the predetermined ranking or higher on the second results list, calculating the total item-view further comprises, for each time the record was clicked by any user during the time period, determining a second position of the record on a second results list on which the record was located when the record was displayed;
   the predetermined ranking is a power of 2 or greater;
   the first database cluster H is stored on a first database server;
   the second database cluster L is stored on a second database server;
   the first database server has greater processing capabilities than the second database server;
   the one or more non-transitory memory storage modules storing the computing instructions are further configured to run on the one or more processing modules and perform acts of:
      entering the total click-through for the record and the total item-view for the record in a feature vector that is used by a predictive model to determine a predicted likelihood of the record being accessed; and
      determining the time period in real time on a dynamic basis; and
   placing the record in either the first database cluster H in the database system or the second database cluster L in the database system based on the total click-through for the record and the total item-view for the record further comprises storing the record in either the first database cluster H in the database system or the second database cluster L in the database system based on the predicted likelihood of the record being accessed.

* * * * *